US009808114B1

(12) United States Patent
Heys et al.

(10) Patent No.: US 9,808,114 B1
(45) Date of Patent: Nov. 7, 2017

(54) AUTOMATED MACHINE FOR PRODUCING MULTIPLE CUPS OF COFFEE

(71) Applicant: Steady Equipment Corporation, Brooklyn, NY (US)

(72) Inventors: Stuart Heys, Brooklyn, NY (US); Mark Sibenac, Pittsburgh, PA (US); Stephan von Muehlen, Brooklyn, NY (US)

(73) Assignee: Steady Equipment Corporation, Brooklyn, NY (US)

( * ) Notice: Subject to any disclaimer, the term of this patent is extended or adjusted under 35 U.S.C. 154(b) by 298 days.

(21) Appl. No.: 14/619,669

(22) Filed: Feb. 11, 2015

Related U.S. Application Data

(60) Provisional application No. 61/965,957, filed on Feb. 11, 2014.

(51) Int. Cl.
  *A47J 31/46* (2006.01)
  *A47J 31/52* (2006.01)
  *A47J 31/44* (2006.01)

(52) U.S. Cl.
  CPC ............... *A47J 31/46* (2013.01); *A47J 31/44* (2013.01); *A47J 31/52* (2013.01)

(58) Field of Classification Search
  CPC .............. A47J 31/46; A47J 31/52; A47J 31/44
  USPC ............................ 99/280, 298, 300, 304–320
  See application file for complete search history.

(56) References Cited

U.S. PATENT DOCUMENTS

| | | | | |
|---|---|---|---|---|
| 3,618,642 A | * | 11/1971 | Beaulieu | B65B 43/50 141/1 |
| 4,550,652 A | * | 11/1985 | Da Silva | A47J 31/007 222/486 |
| 4,971,039 A | * | 11/1990 | Noske | A61B 17/2255 601/4 |
| 4,971,120 A | * | 11/1990 | Credle, Jr. | B67D 1/0021 141/1 |
| 5,000,345 A | * | 3/1991 | Brogna | B67D 1/00 141/103 |
| 5,072,859 A | * | 12/1991 | Wiley | B67D 1/0041 222/1 |
| 5,350,082 A | * | 9/1994 | Kiriakides, Jr. | G07F 13/10 221/1 |
| 5,664,480 A | * | 9/1997 | DiFilippo | A47J 31/0605 99/299 |

(Continued)

FOREIGN PATENT DOCUMENTS

WO    0057761 A1    10/2000
WO    2012092292 A2    7/2012

*Primary Examiner* — Sean Michalski
(74) *Attorney, Agent, or Firm* — Myers Wolin, LLC

(57) ABSTRACT

A coffee maker efficiently automates the process of pour-over coffee brewing by employing a computer system that controls how and when hot water is dispensed into a coffee filter. The computer system controls a mechanism that pulls a nozzle back and forth along a linear track, and rotates the linear track. A user generally puts a coffee filter in place and then pushes a button on the computer system once to allow the system to wet the coffee filter. Then the user could put coffee grounds into the coffee filter and push the button again to allow the system to lightly wet the surface of the coffee grounds. The user could then place the coffee cup underneath the filter and push the button a third time to allow coffee to be slowly brewed as spirals of hot water are dispensed on the coffee grounds.

17 Claims, 13 Drawing Sheets

(56) References Cited

U.S. PATENT DOCUMENTS

| | | | | |
|---|---|---|---|---|
| 5,865,094 A * | 2/1999 | Kealy | A47J 31/007 | 141/106 |
| 6,053,359 A * | 4/2000 | Goulet | B67D 1/00 | 141/174 |
| 6,155,158 A * | 12/2000 | Anson | A47J 31/007 | 99/280 |
| 6,481,188 B1 * | 11/2002 | Graham | B29C 66/003 | 53/373.5 |
| 6,550,637 B1 * | 4/2003 | Erikawa | G07F 13/10 | 221/119 |
| 6,729,226 B2 * | 5/2004 | Mangiapane | A47J 31/446 | 99/289 P |
| 6,940,081 B1 * | 9/2005 | Bar | B05D 3/0263 | 250/338.1 |
| 7,321,807 B2 * | 1/2008 | Laski | B08B 3/024 | 318/568.11 |
| 7,673,555 B2 | 3/2010 | Nosler et al. | | |
| 7,770,510 B2 * | 8/2010 | Hart | A47J 31/007 | 99/279 |
| 7,987,767 B2 * | 8/2011 | Hester | A47J 31/002 | 99/280 |
| 8,156,858 B2 * | 4/2012 | Carbonini | A47J 31/52 | 426/433 |
| 8,515,574 B2 * | 8/2013 | Studor | A47J 31/44 | 426/433 |
| 8,661,966 B2 * | 3/2014 | Stearns | A47J 31/41 | 426/231 |
| 8,752,476 B2 | 6/2014 | Lin | | |
| 8,800,817 B2 * | 8/2014 | Norris | B67D 3/0009 | 222/131 |
| 8,881,642 B2 * | 11/2014 | Hart | A47J 31/46 | 426/286 |
| 8,910,563 B2 * | 12/2014 | Hulett | A23F 5/262 | 99/280 |
| 9,218,704 B2 * | 12/2015 | Lim | G07F 13/065 | |
| 9,327,958 B2 * | 5/2016 | Angus | B67D 1/0041 | |
| 2003/0200871 A1 * | 10/2003 | Mangiapane | A47J 31/446 | 99/291 |
| 2005/0061156 A1 * | 3/2005 | Hart | A47J 31/007 | 99/275 |
| 2005/0121104 A1 * | 6/2005 | Monzel | B65G 47/846 | 141/144 |
| 2007/0150101 A1 * | 6/2007 | Laski | B08B 3/024 | 700/245 |
| 2007/0243294 A1 * | 10/2007 | Hayes | A47J 31/002 | 426/135 |
| 2008/0168905 A1 * | 7/2008 | Hart | A47J 31/46 | 99/280 |
| 2009/0101233 A1 * | 4/2009 | Owens | B67D 1/0041 | 141/369 |
| 2009/0158937 A1 * | 6/2009 | Stearns | A47J 31/41 | 99/280 |
| 2009/0205502 A1 * | 8/2009 | Carbonini | A47J 31/52 | 99/280 |
| 2009/0258114 A1 * | 10/2009 | Lassota | A47J 31/56 | 426/78 |
| 2011/0088559 A1 * | 4/2011 | Dahmen | A47J 31/007 | 99/281 |
| 2012/0138635 A1 * | 6/2012 | Norris | B67D 3/0009 | 222/131 |
| 2012/0156344 A1 * | 6/2012 | Studor | A47J 31/44 | 426/433 |
| 2012/0183659 A1 * | 7/2012 | Hulett | A23F 5/262 | 426/431 |
| 2013/0106690 A1 * | 5/2013 | Lim | G07F 13/065 | 345/156 |
| 2013/0125759 A1 | 5/2013 | Lin | | |
| 2014/0041748 A1 * | 2/2014 | Angus | B67D 1/0041 | 141/1 |
| 2014/0272047 A1 | 9/2014 | Rosati et al. | | |
| 2015/0033948 A1 * | 2/2015 | Lawson | A47J 31/007 | 99/289 R |
| 2015/0289712 A1 * | 10/2015 | Choi | A47J 31/54 | 99/300 |
| 2016/0052767 A1 * | 2/2016 | Eaton | B67C 3/202 | 141/9 |

* cited by examiner

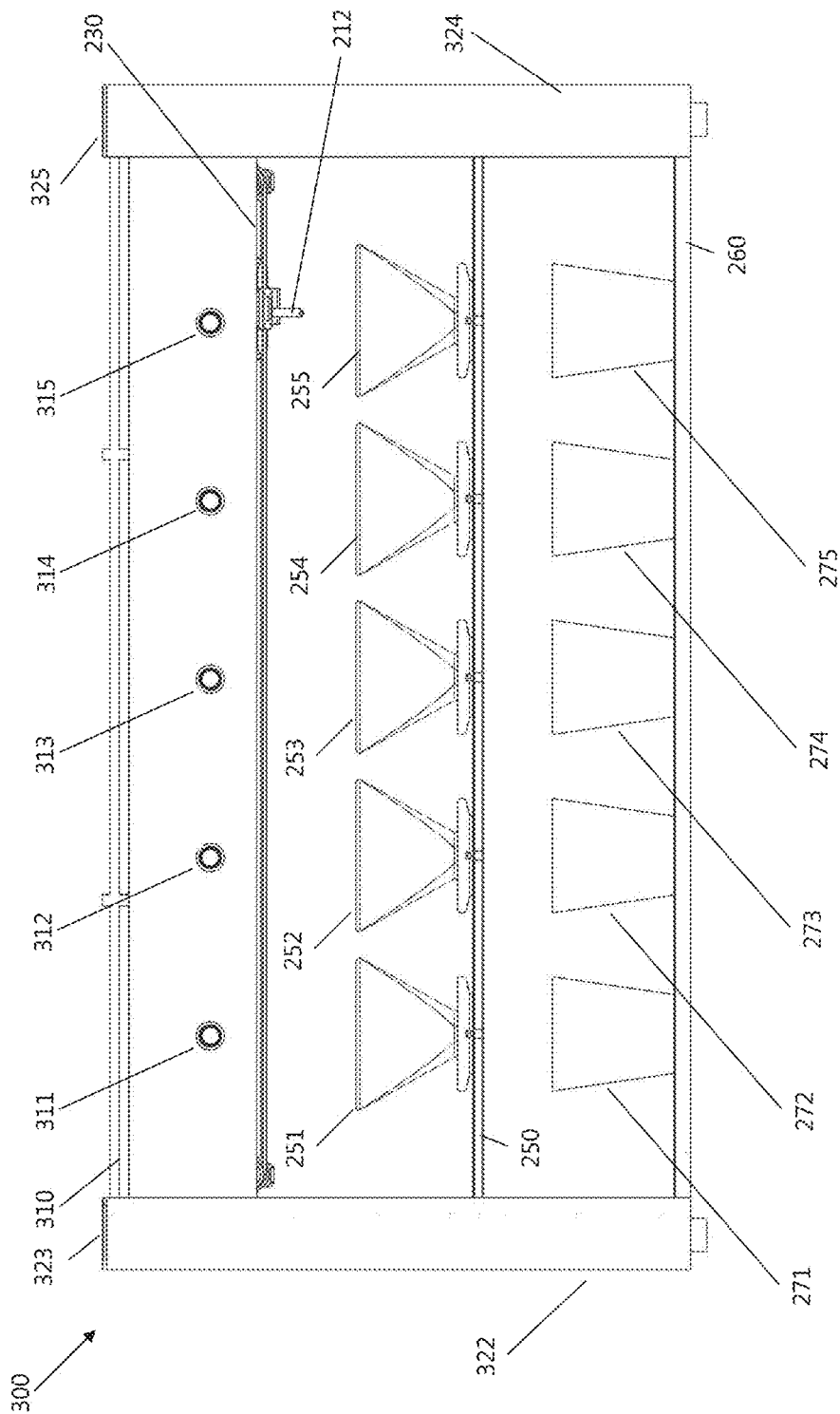

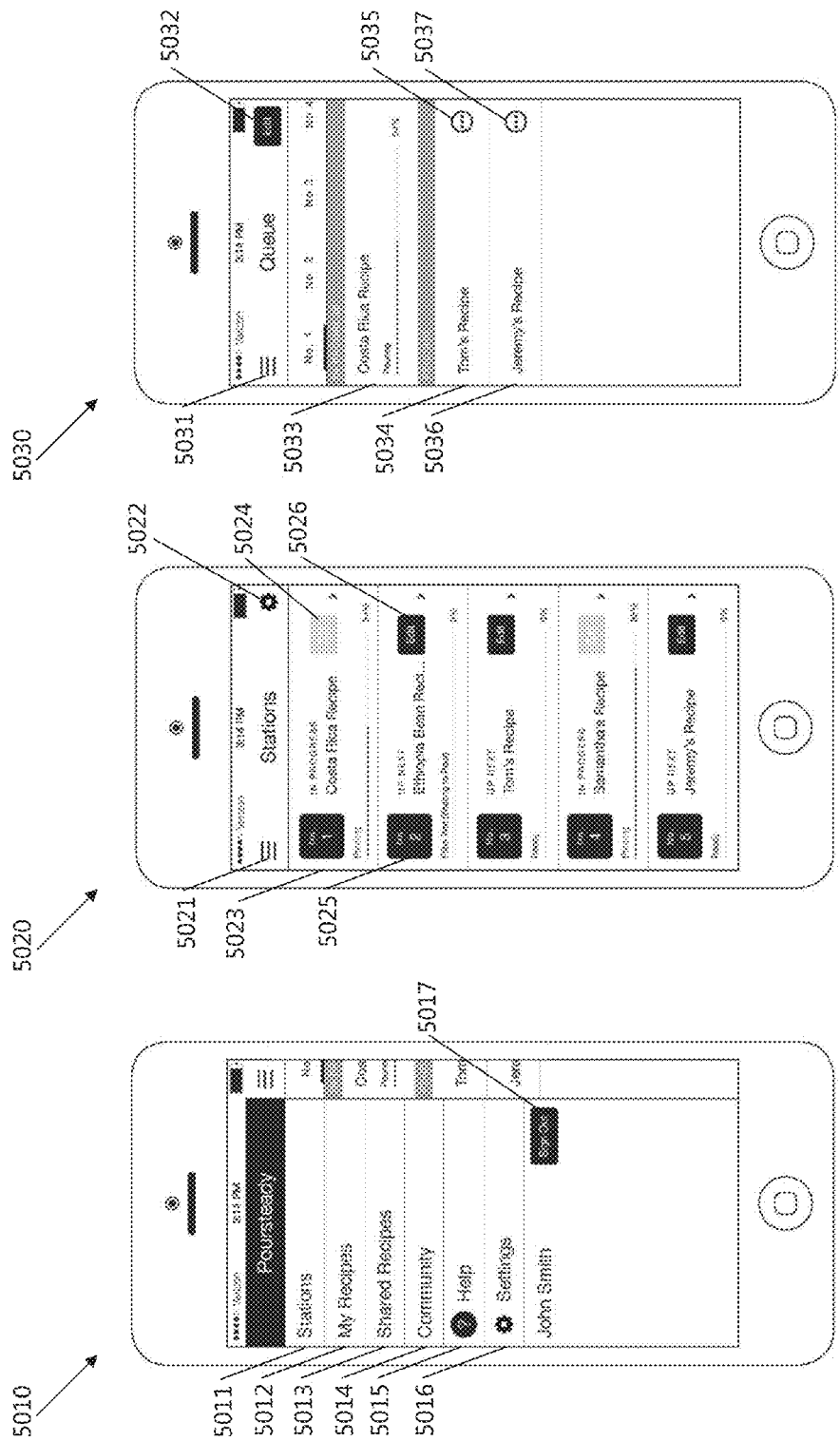

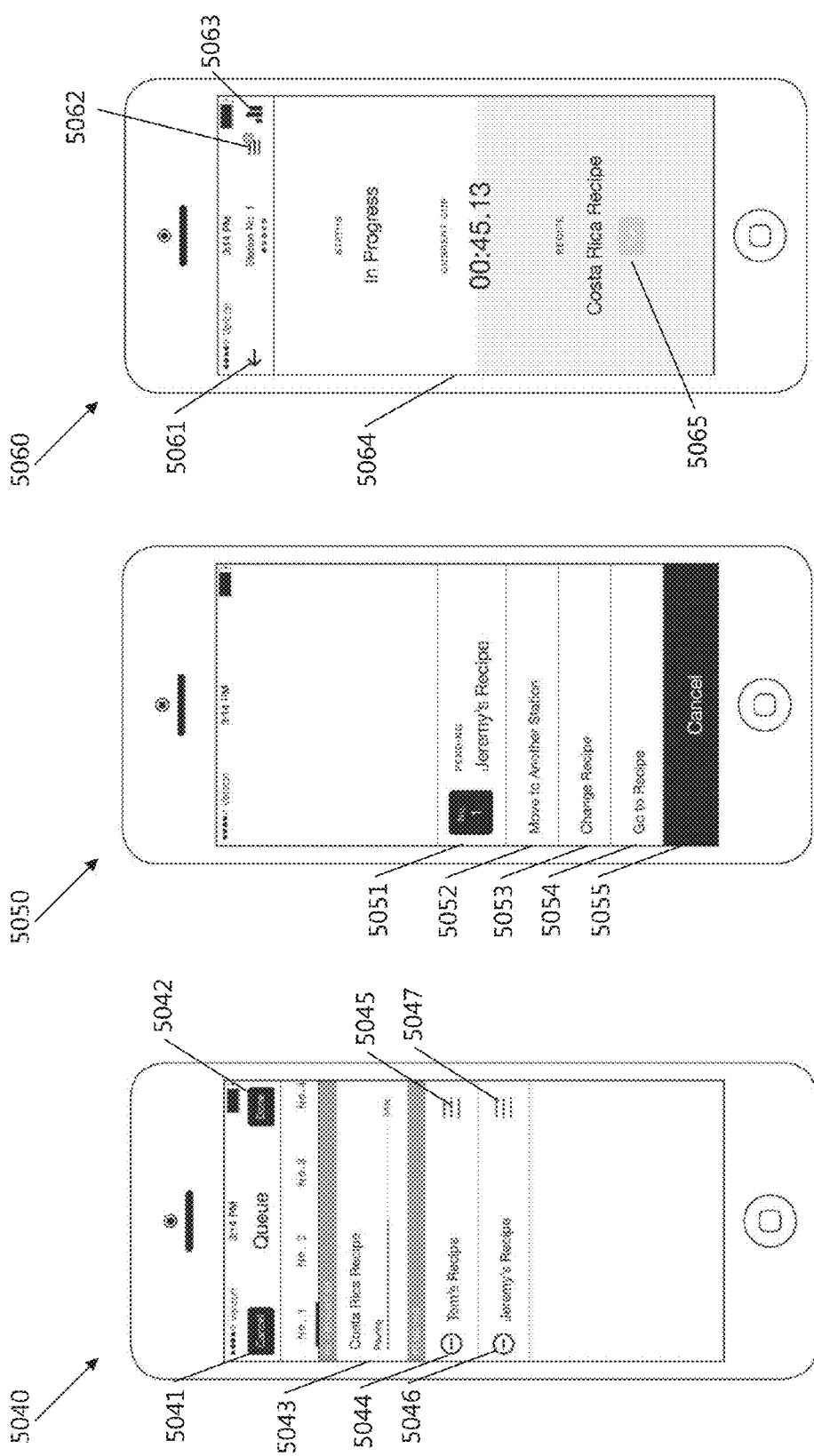

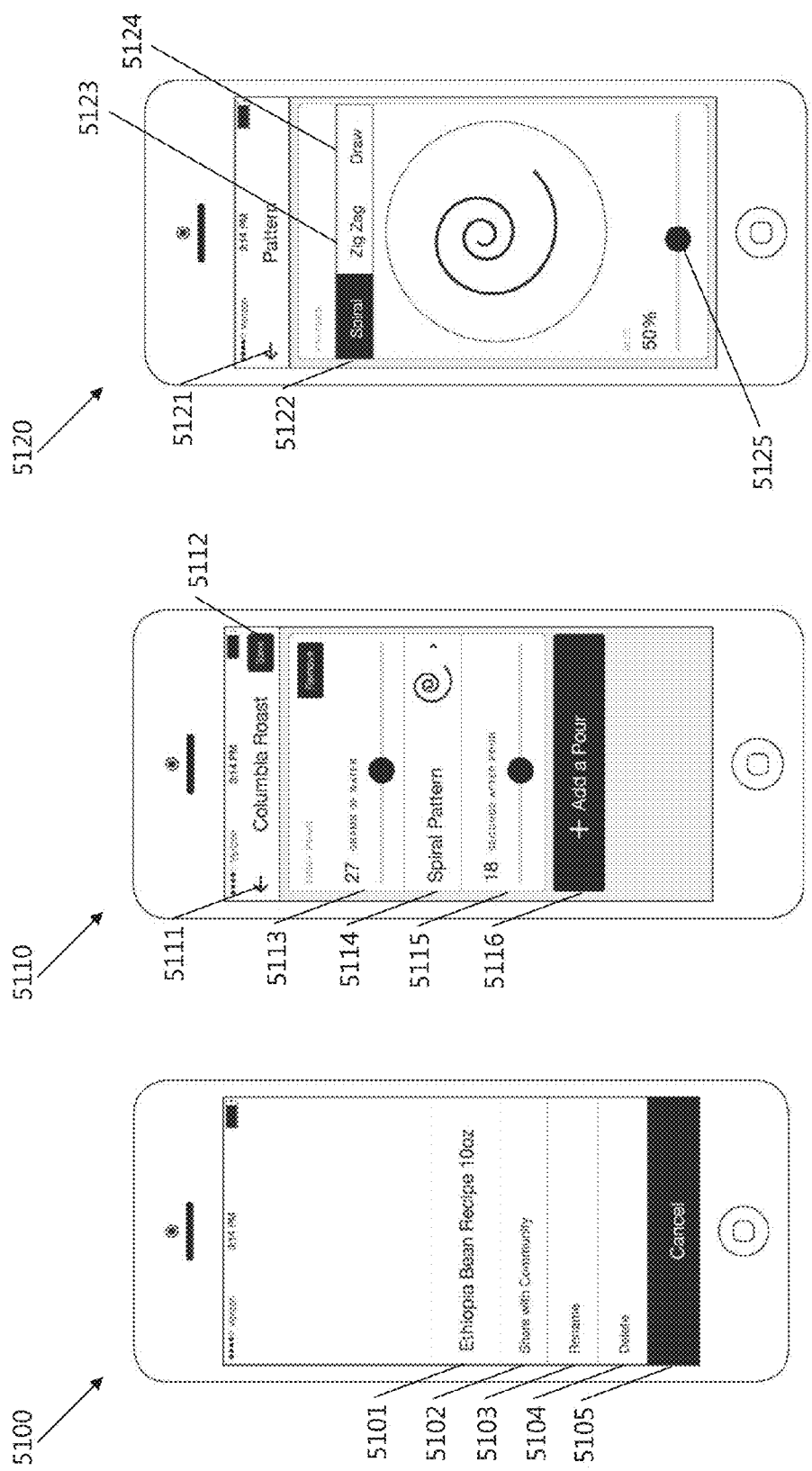

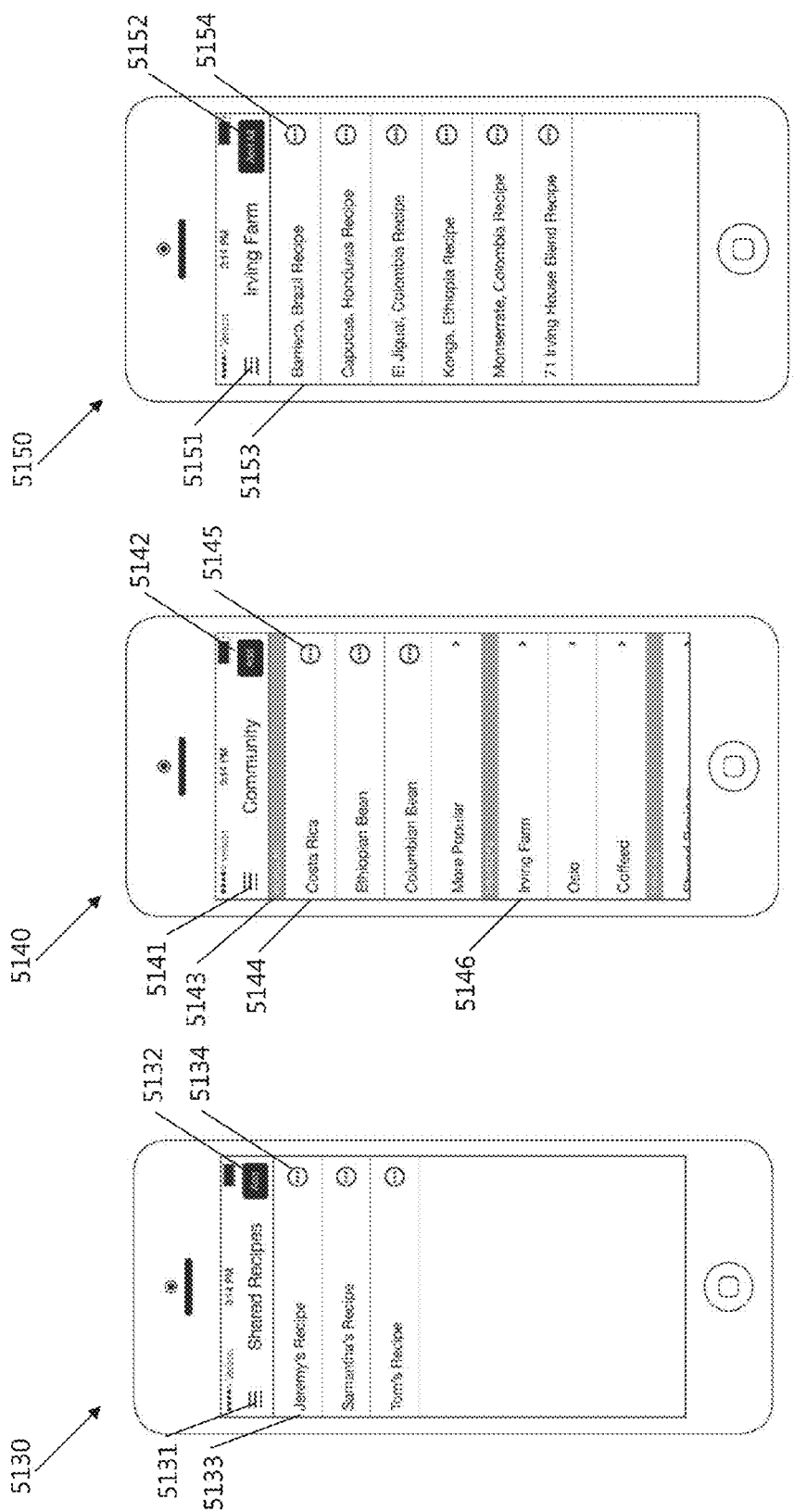

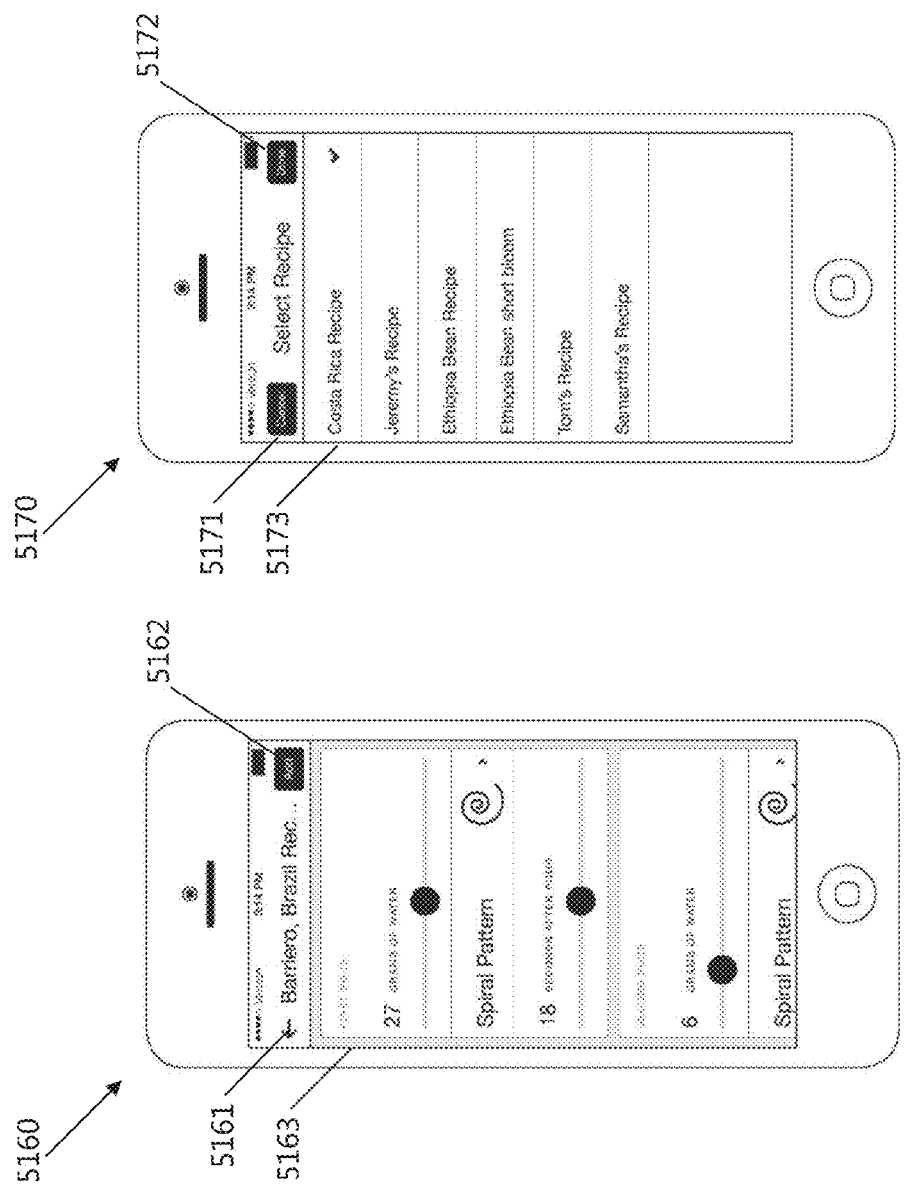

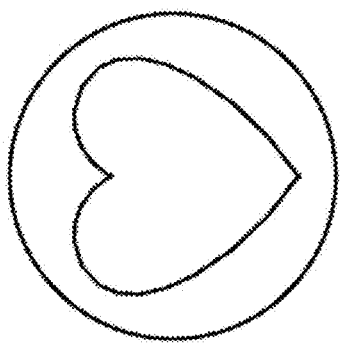
Figure 8E
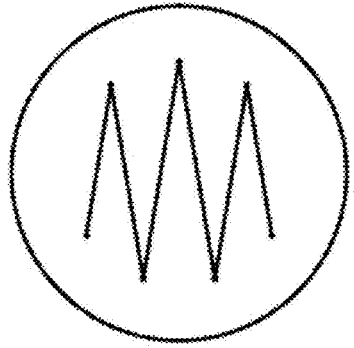
Figure 8C
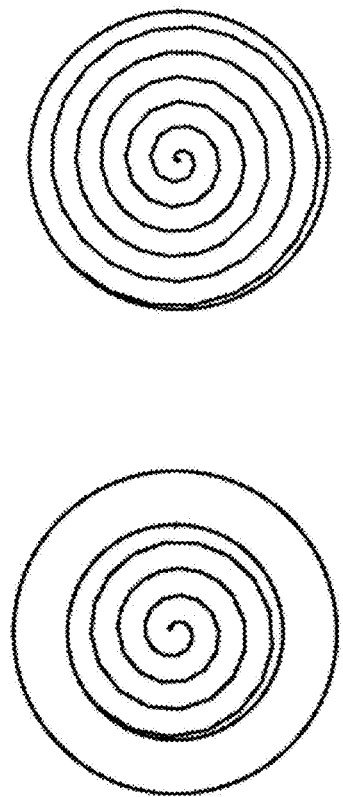
Figure 8B
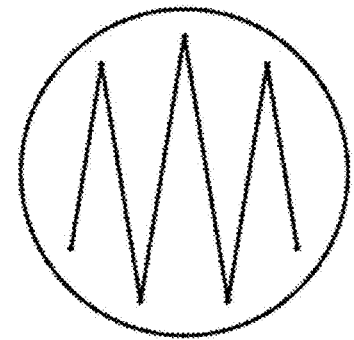
Figure 8D
Figure 8A

AUTOMATED MACHINE FOR PRODUCING MULTIPLE CUPS OF COFFEE

This application claims the benefit of priority to U.S. provisional application No. 61/965,957, filed on Feb. 11, 2014. This and all other publications referred to herein are incorporated by reference.

FIELD OF THE INVENTION

The field of the invention is commercial coffee brewing machines

BACKGROUND

This background provides information which may be helpful in understanding the inventive subject matter. The act of providing such information is not an admission that the information, implicitly or explicitly provided, is prior art to the inventive subject matter. All publications referred to herein are incorporated by reference in their entirety. Where a term is defined, explicitly or implicitly, contrary to a definition of the term provided herein, the definition of the term provided herein should be understood to be the definition used to interpret the inventive subject matter.

Pour-over coffee brewing, whether performed in a commercial or residential setting, is nearly always done by hand. Ground coffee beans are generally placed in a paper filter or perforated stainless steel cone held in a glass, ceramic or plastic filter holder and the user gradually adds hot water evenly to the entire surface area of the coffee grounds. It is a task requiring skill, consistency and patience as a single cup can take 2-3 minutes to brew. Often, the water is added in several small pours with pauses in between each pour in order to maximize extraction.

When using the pour-over method, commercial coffee shops often brew several cups concurrently where a barista carefully adds water to each filter at the appropriate moment of the brewing cycle. Pouring water into each filter one at a time and requiring a barista to carefully monitor when to add water to the filter is inefficient use of a skilled barista. In addition, a busy barista may be unable to add water to the filter at the appropriate times, detracting from the quality of the coffee.

Previous attempts to automate the brewing process for pour-over coffee have been particularly inefficient, and typically require independent pouring spouts for each cup to be brewed. Requiring each coffee making station to use a separate pouring spout can be inefficient and wasteful when, for example, attempting to brew multiple cups simultaneously.

A variety of approaches have been attempted, for example the apparatus' disclosed in WO2000/057761, U.S. Pat. No. 8,752,476, U.S. Pat. No. 8,910,563, and US2014/0272047, but typically all require that the system be reproduced above each coffee making station in order to serve a plurality of pour-over coffee stations, which is inefficient.

Thus, there is a need for a system and method to dispense hot water in a pour-over coffee machine in a more efficient manner, particularly in such a machine brewing multiple cups simultaneously.

SUMMARY OF THE INVENTION

As used herein, the term "coupled to" means any direct coupling or indirect coupling of two apparatus'. A direct coupling occurs when a surface of the first apparatus physically touches a surface of the second apparatus and wherein a coupling object must be moved or removed to separate the first apparatus from the second apparatus. An indirect coupling occurs when a surface physically touches one or a series of intermediary objects, which then physically touches a surface of the second apparatus, and the intermediary object(s) must be moved or removed to break the connection.

Unless the context dictates the contrary, the steps of any disclosed method can be performed in any suitable order. The disclosed examples are provided to provide guidance and clarity regarding specific conceptual embodiments of the invention, and do not pose a limitation on the scope of the claimed invention. No language in the specification indicates a non-claimed element essential to the invention.

All groups and lists of alternative embodiments to the invention are to be construed as separate embodiments, not as a single embodiment containing a group. Thus, each member of a group or list can be claimed individually along with members of the group, or members of another group.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The present invention automates the brewing of one or more cups of pour-over coffee while carefully controlling the water temperature, the wetting pattern of the grounds and the timing of the brew cycle. The control software and user interface serve to minimize the time between cups of coffee served by dynamically responding to inputs from the coffee making machine, the point-of-purchase, and other remote devices in real-time (such as web-based services, mobile apps, or other client/server infrastructures). Using these means, overall throughput of coffee and consistency between cups of coffee could be dramatically improved over manual methods performed by a skilled barista.

The mechanical core of the invention is an automation system capable of aiming or directing a nozzle at one or more areas of one or more coffee filters. Where the term "aim" or "aiming" is used, it will be understood that such language is not intended to be limiting. The system may simply direct the nozzle at different portions of a coffee filter or cup or other location, and a precise location within such location is not aimed at unless this application explicitly indicates that it is. When the nozzle is coupled to a valve that dispenses water, the nozzle could be used to rinse off a filter, dampen coffee grounds, and brew coffee. While the aiming or directing mechanism could be a pair of linear motors, one that pulls the nozzle along an x-axis and another that pulls the nozzle along a y-axis, or any other configuration, a preferred aiming mechanism has a linear motor and a rotational motor. While the configurations described incorporate motors, it will be understood that any mechanism for generating the appropriate movement, such as directed or jetted water flow to rotate or move a nozzle, may be substituted. In one embodiment, a linear motor moves the nozzle linearly along a lateral direction and a rotational motor moves the nozzle rotationally around this lateral axis. The linear motor could be carriage motor that moves the nozzle along the substantially linear track with a carriage belt, and the rotational motor could be a tilt motor that rotates the track itself. As used herein, a "substantially linear" track is a track where any 10 cm segment is a straight line within a 0.5 cm tolerance. The carriage motor and the tilt motor could be servo motors that direct the nozzle using timing belts. By combining the motions of these two axes, the water stream can be directed into an area of one of several filter holders placed below the linear track. A computerized control system could coordinate these two motors to direct the water stream in any number of patterns into any one of the filter holders.

A flexible hose generally runs from the water source (usually a hot water source providing water at a temperature of 195-212° F.) to a valve located just above the nozzle. In other embodiments, the valve could be located distally from the nozzle, for example on a rail or on a non-moving structure. The valve could be any valve suitable for controlling water flow to/from the nozzle, but is preferably a solenoid valve that is controlled by the computer system. The mechanism preferably has a rigid cable carrier that surrounds his hose to protect the hose from catching on the moving parts and fraying over time. The rigid cable carrier could be made of a plurality of hollow containers that surround the exterior of the hose and are rotatably coupled to one another to allow the cable carrier to flex with the hose as the nozzle moves up and down the rail assembly. Preferably, the rigid cable carrier is made of cubic, or rectangular box-shaped containers that surround the hose on 4 sides, allowing the hose to thread through the remaining 2 sides. As used herein, containers that are "rotatably coupled" to one another are coupled together via a rotating hinge that allows one container to rotate about a pivot point while the containers are still attached. Electronics could also be threaded through the rigid cable carrier to send control signals to the valve to open and close it. The other side of the hose could be coupled to a water source, such as refrigerated water tank for chilled water, a water tank for room-temperature water, or most preferably a water heater for hot water. The computer control system could then engage the valve whenever the flow of water to a destination in the coffee filter is desired.

The substantially linear track is generally above discrete stations that water is dispensed to from the nozzle. Each station could have a shelf to support a filter holder in line with the lateral axis of the linear track. Any of these filter holders could be reached by the water nozzle as it traverses along the lateral axis. Underneath each filter holder is preferably a cup holder with a drip tray, where coffee cups could be placed when the filter and coffee grounds are ready for brewing. In alternative embodiments, the track could be curved, such as in an S-pattern, with coffee stations at the peak of each S-curve. In such embodiments, the nozzle is preferably rotatable to allow the nozzle to be aimed at any portion of the coffee filter.

The nozzle could be located below the rotational axis of the linear track so that, as the rail assembly is rotated, the nozzle tip could be directed towards opposite sides of the track, thus allowing a low pressure stream of water to reach the longitudinal extremes of the filter holders, while the carriage motor allows the stream of water to hit the latitudinal extremes of the filter holders. By employing both motors, the nozzle could dispense the water stream in a spiral pattern, either from the edge of the filter towards the center, or from the center of the filter outwards to the edges of the filter. Other patterns, such as heart-shaped patterns or zig-zag patterns, could also be dispensed using the nozzle.

The computer system has a processor and a non-transient computer-readable memory configured to hold software that controls portions of the apparatus, such as the motors that control the position of the nozzle, the valve that opens and closes the nozzle, the heating unit that controls the temperature of the water, a notification alarm that signals to a barista that a task should be completed, and other input and output user interfaces. In order to brew a cup of coffee, the computer system is generally configured to schedule three dispensations of hot water into each coffee filter: (1) A first dispensation of hot water that washes and lightly dampens the entire coffee filter, (2) a second dispensation of hot water that wets coffee grounds within the coffee filter to allow initial carbon dioxide to bubble out before brewing, and (3) a third dispensation of hot water that brews the coffee. Each dispensation of water is preferably spiral-shaped so that a single uninterrupted water flow could be used to wet every portion of the coffee filter, although other patterns could be used to cover a majority of the surface area of the filter. The third dispensation of hot water is typically staggered over a period of time such that only a little water sits in the coffee filter while it brews. When brewing a plurality of cups of coffee, the single nozzle could service multiple coffee stations, particularly between the first and second dispensations or during the third dispensation cycle, when the pours are short and staggered. While a specific pattern of dispensations is outlined, it will be understood that alternative patters may be implemented as well, and in some embodiments, such patterns may be provided by recipes, and may be implemented differently for different coffee stations. For example, the pattern discussed may be implemented for a cup of coffee at a first station while a different pattern is implemented to brew tea at a second station. The computer system may then coordinate the most efficient way to implement the different recipes or patterns being applied. As used herein, a "beverage recipe" is a series of pours performed by a coffee station in sequence to brew a single beverage at that coffee station. Typically, a plurality of recipes is queued by the control computer system over a plurality of coffee stations for a given pour-over brewing apparatus.

In a preferred embodiment, the control computer system is configured such that a single button controls each of the three dispensations of hot water for each coffee station. In another embodiment, a second button could be used to determine the size of the portion of coffee. In an exemplary embodiment, a coffee barista first places a coffee filter within a coffee filter holder and then pushes the corresponding button. After the button is pushed once, the first dispensation of water lightly wets the coffee filter. A notification alarm preferably activates when the system is ready for the next step (e.g. a light activates around the button or a sound chimes), notifying the coffee barista that the machine is ready for the next step. Then the coffee barista could then fill the dampened coffee filter with coffee grounds and pushes the same corresponding button. After the button is pushed a second time, the second dispensation of water lightly wets the coffee grounds. While the coffee barista could wait until most of the carbon dioxide has bubbled out of the coffee grounds before placing a cup underneath the filter and pushing the button for a third time, a notification alarm preferably activates after a predetermined set of time which calculates when the system is ready for the next step in order to notify a barista that a cup of coffee will start to pour. In preferred embodiments, after a predetermined set amount of time after the second dispensation of water, the machine will automatically initiate the third dispensation of water. During the third dispensation, the nozzle could be scheduled to dispense water into the coffee filter in spurts with a timed delay, such as 20 seconds, in between spurts. The computer system could perform a staggered dispensation of water in two or more different coffee stations simultaneously by alternating between the coffee stations during the timed delay. In some alternative embodiments, the barista need not take any action during brewing, with the entirety of the process being automated.

The automated tasks and notification system allows the barista to be free to do other tasks in the shop until the machine notifies the barista that any of the phases are completed. The machine could determine this, for example, by waiting a threshold period of time, by monitoring the coffee grounds to ensure the bubbling process has been completed (such as through a camera sensor or through a temperature sensor), or by another suitable means. Notification alarms from the computer system to the barista are generally in the form of an activated light or a sound playing on a speaker, although other notifications, such as a vibrating device or a pop-up on a screen could be used without departing from the scope of the invention.

In preferred embodiments, the computer system could be configured to schedule an artistic shape for the nozzle path to create a shape along the surface of the coffee grounds that is different from the standard spiral pattern. The artistic shape could be made from a single spurt of water, such as a closed heart or a cursive letter or word, or could be made from a plurality of spurts of water, such as a figure of a character or a plurality of words. A plurality of spiral shapes could be programmed in the computer system to allow different types of spiral shapes for each customer or could be used for different dispensations of water within a single cup. The artistic shape could be selected by a barista or by a customer, such as the first letter of a customer's name or a logo of the coffee shop.

The computer system could also be configured to receive input from a remote device, such as a phone, tablet, or desktop computer connected to a network such as the Internet, to allow users of the remote device to schedule pours. For example, a barista could program and save specific settings, or a "recipe," for an individual cup and assign that recipe to a specific station, or a customer could send in a remote request for coffee. The computer system could further be configured to accept a transaction from such a remote user by charging the user's credit card or a debit account. Once a remote request is made, the dispensations of water could be scheduled at a future time. This scheduled request could contain a specific time when the coffee should be submitted, which could be directly submitted from a user or could be calculated by the computer system based upon a current location of a customer. For example, the user might be in a location that is estimated to take 20 minutes to arrive. If a typical cup of coffee takes 5 minutes to brew, the coffee might be scheduled to start in 15 minutes. Alternatively, the computer system may track a location of the remote user, and when the remote user enters within a predefined radius, the computer system could start brewing coffee. In other embodiments, the computer system may accept a time from the customer user interface, which the computer system uses to calculate when to start brewing.

This layout allows a single water nozzle to service two or more stations for pour-over coffee brewing, dramatically increasing throughput without a significant increase in complexity. The linear motor provides the dual purpose of (1) transporting the water nozzle from one coffee filter to another coffee filter, and (2) moving the nozzle to create the spiral pattern and ensure that multiple areas of the coffee filter are dampened. The pour-over method typically includes periods of waiting in between pours as the brewing coffee seeps through the filter. Since the pours are staggered over time, as the computer is waiting for the coffee in one filter to seep through, the computer could move the nozzle to another filter and apply the next pour, increasing the overall efficiency of brewing several cups of coffee. The computer system handles scheduling of water dispensations from coffee station to coffee station with ease, such that a plurality of water dispensations, and even different lengths of water dispensations (e.g. for different sizes of coffee) are scheduled. This is particularly useful during the brewing process, since a human barista might lose count when staggering pours between different coffee stations where a computer system would not.

Because the machine is controlled by a computerized system, the consistency between different cups of coffee is virtually guaranteed. The wetting patterns are repeated to a very close tolerance to one another and the timing of pours is precisely controlled. In a commercial shop, consistency between coffee and throughput of coffee cups are of paramount importance to ensure a large quantity of virtually identical cups of coffee delivered to customers, both of which are delivered by this machine.

In some embodiments, an apparatus is provided for brewing multiple cups of coffee comprising a nozzle configured to dispense water, the nozzle configured to be movable between a plurality of brewing stations, and further configured to direct water towards multiple locations at each of the brewing stations. Each brewing station may comprise a coffee filter holder, and may contain a filter and may be provided with coffee grounds, such that the nozzle directs water towards multiple locations on a surface of a coffee filter containing grounds within the brewing station.

In some embodiments, an apparatus may implement a method for brewing coffee, the method comprising moving a nozzle to a first brewing station, locating a coffee filter within the first brewing station, utilizing the nozzle to direct water to a first location on a surface of the coffee filter, modifying a direction of the nozzle and utilizing the nozzle to direct water to a second location on the surface of the coffee filter, adding a layer of coffee grounds at the first brewing station, utilizing the nozzle to direct water to a first location on the layer of coffee grounds, modifying the direction of the nozzle and utilizing the nozzle to direct water to a second location on the surface of the layer of coffee grounds. This method may be further modified by adding a time delay and only after the time delay utilizing the nozzle to again direct water to a first location on the layer of coffee grounds, modify the direction of the nozzle and again utilize the nozzle to direct water to a second location on the surface of the layer of coffee grounds.

In some embodiments, the method may be implemented at a second brewing station simultaneously, and the use of the nozzle to direct water first at the coffee filter and then at a layer of coffee grounds may interspersed with a second instance of the water dispensations described with respect to the first brewing station occurring at the second brewing station.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 5 is a front plan view of the exemplary pour-over coffee system of FIG. 2, having covers applied.

FIG. 8A-8E show exemplary spiral patterns that could be programmed into an inventive control computer system.

DETAILED DESCRIPTION OF THE INVENTION

Figure 1:
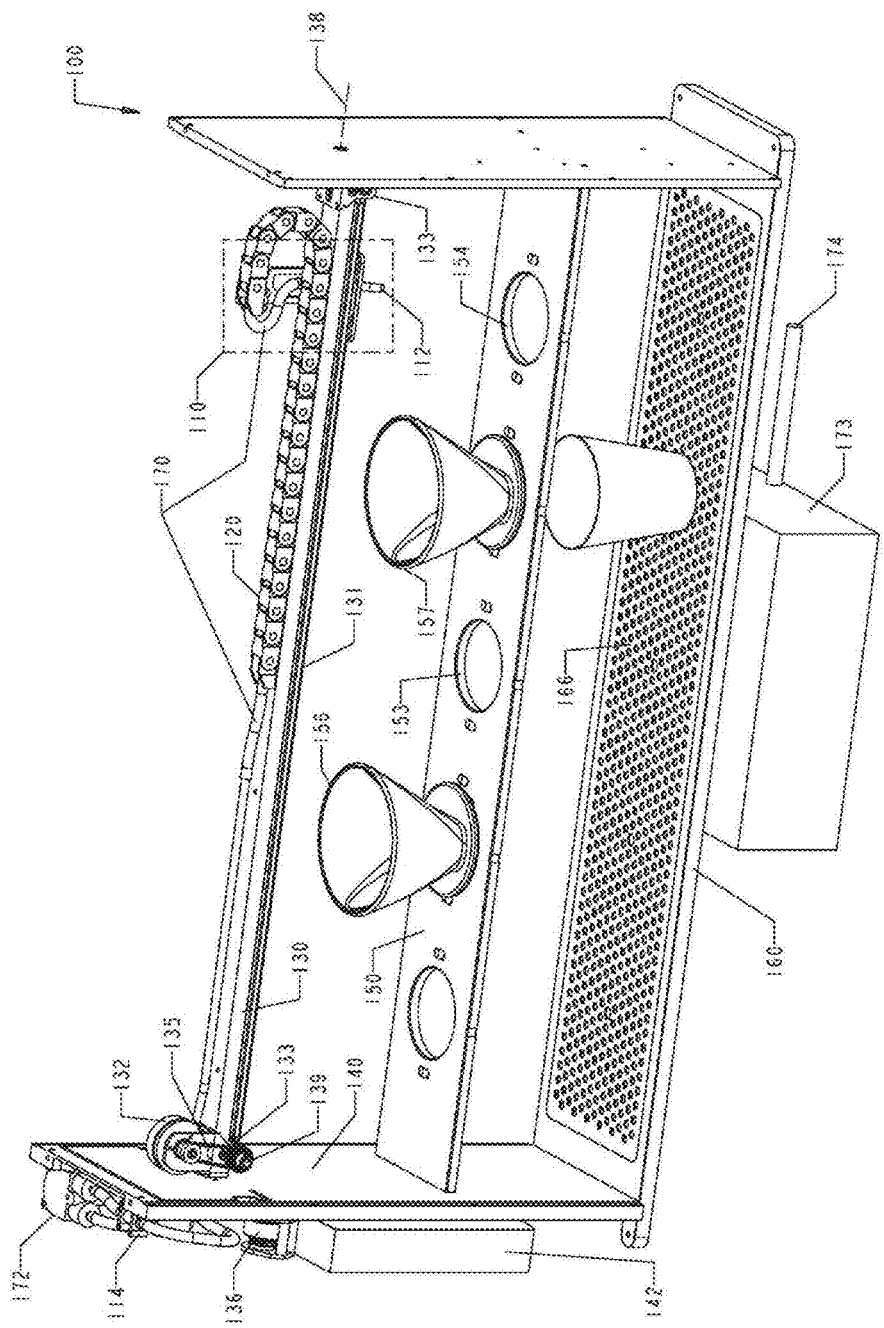
FIG. 1 is a front perspective view of an exemplary pour-over coffee system.
Figure 2:
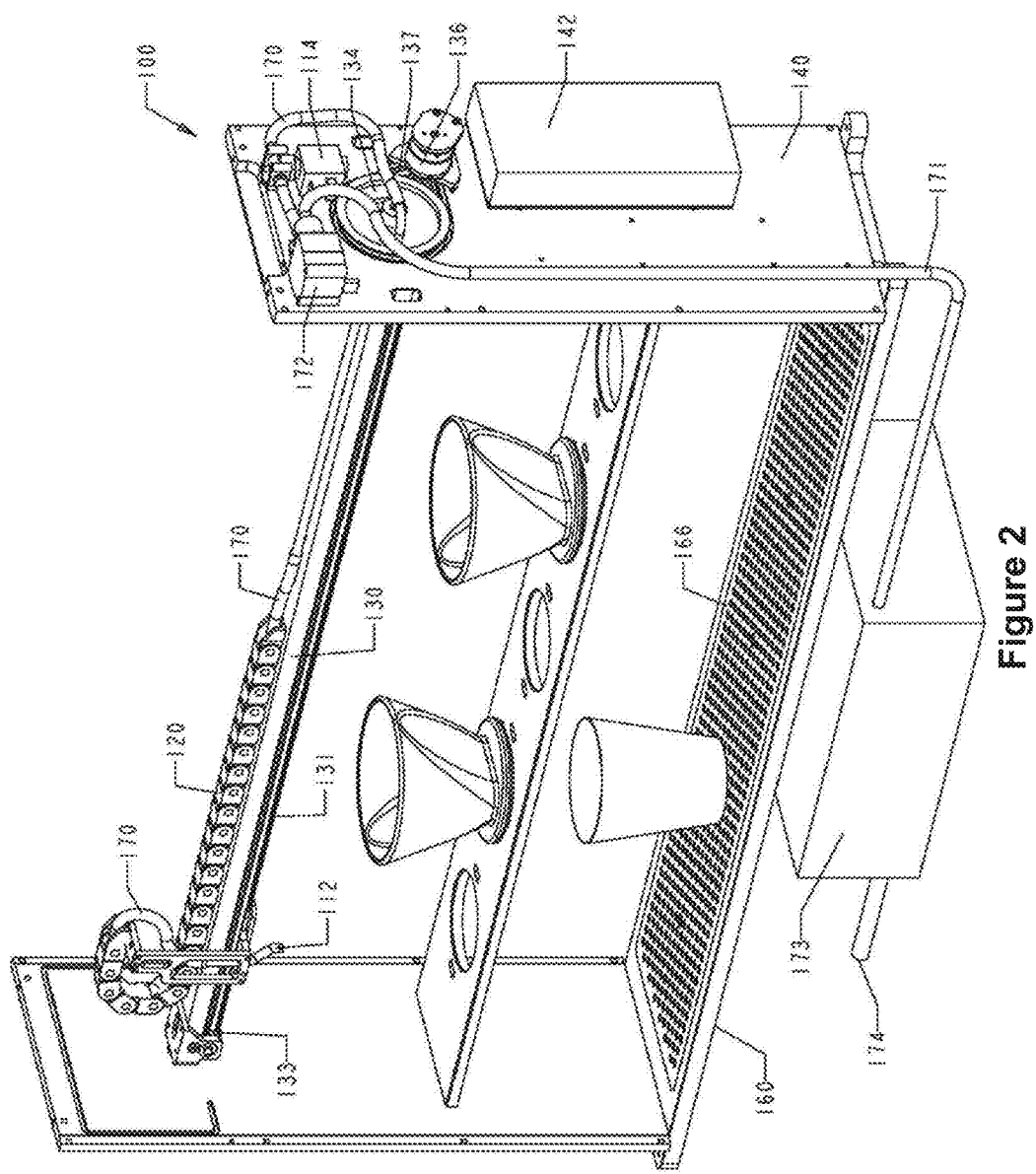
FIG. 2 is a rear perspective view of the exemplary pour-over coffee system of FIG. 1.

FIGS. 1 and 2 show an exemplary pour-over brewing apparatus 100 having a carriage assembly 110, hose carrier 120, rail assembly 130, end plate 140, rack 150, and drip tray 160.

In FIGS. 1 and 2, brewing apparatus 100 preferably has a machine framework that is largely built of machined aluminum components coupled to each other with threaded fasteners. Rail assembly 130 could comprise a rail having carriage assembly 110, which delivers water to various areas using nozzle 112. Rail assembly 130 is preferably made from an extruded, anodized aluminum, and carriage assembly 110 is preferably mounted to a plastic anti-friction brushing designed for linear motion that acts to constrain movement of carriage assembly 110 in all but one substantially linear direction. A rack 150 below nozzle 112 and above the drip tray 160 provides a series of mounting points, such as holes 153 and 154 that are sized and disposed to receive filter holders, such as filter holders 156 and 157. Rack 150 could be installed as a non-integral component of apparatus 100 such that rack 150 could be easily removed. Removing rack 150 from apparatus 100 allows a user to provide and use a one-piece filter holder and container to prepare a beverage under carriage assembly 110.

A drip tray 160 is preferably mounted underneath rack 150 to support cups for each coffee station and to catch liquid that is not caught by a cup on drip tray 160. Drip tray 160 could be machined as a shallow sloped trough to aid drainage, and could be configured with a drain (not shown) at the lowest point to guide fluid to a sewage pipe or other drip repository. Drip tray 160 is preferably a one-piece machined aluminum tray in the shape of a shallow trough with a drain hole and a thin perforated cover 166. Perforated cover 166 is mounted, as shown, to support 5 coffee stations, although more or fewer stations could be included without departing from the current scope of the invention.

A substantially vertical plate at each end of the machine, such as end plate 140, supports each end of rail assembly 130. Rail assembly 130 could be supported with a rotary ball bearing at each end, allowing the rail to freely rotate about axis 138. End plate 140 also supports carriage tilt motor 136, flow control mechanism 114, flowmeter 172, and control system 142. The embedded control computer system 142 mounted on end plate 140 is generally configured to control the coffee brewing apparatus 100. It should be noted that any language directed to a computer system should be read to include any suitable combination of computing devices, including servers, interfaces, systems, databases, agents, peers, engines, controllers, computer blades, or other types of computing devices operating individually or collectively. Computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed brewing apparatus. In especially preferred embodiments, the various servers, systems, databases, or interfaces exchange data using standardized protocols or algorithms, and data exchanges are preferably conducted over any sort of wired or wireless packet-switched network.

It will be understood that while a substantially vertical plate is discussed and shown as supporting portions of the machine, the portions of the machine may be supported in other ways as well, such as by suspending a portion of the machine over a drainage component, or providing stylized supports. Similarly, the electrical components disclosed may be placed elsewhere within the system.

Control computer system 142 is preferably embedded in a portion of brewing apparatus 100, such as end plate 140, and could be accessed either through a wireless signal (such as Wi-Fi, Bluetooth®, or infrared) or a wired signal (such as a USB, Ethernet, or serial port), although any suitable computer system having a memory, processor, and an I/O interface to the apparatus could be used. The control computer system 142 is generally connected to the motor controls for rotary motor 136 and linear carriage drive motor 132, flow control mechanism 114, flowmeter 172, and other input/output devices through a serial bus or other interface platform based on the controller area network or through an embedded wired/wireless network device. Operators could interact with the computer by pressing push-buttons located at a central control station, a remote control station, at each coffee station, or through a wire/wirelessly connected user interface.

Carriage assembly 110 generally comprises a nozzle 112 coupled to a movable platform constrained to traverse linearly along axis 138. A flexible tube 170 connects the nozzle to a flow control mechanism 114 that controls when nozzle 112 emits liquid and for how long. While flow control mechanism 114 could be any suitable valve that controls liquid flow to nozzle 112, flow control mechanism 114 is preferably a solenoid valve controlled electronically by control computer system 142.

Liquid is typically carried from a liquid source 173 through hose 171, flow measurement device 172, flow control mechanism 114, hose 170 (threaded through driven tilt pulley 134, end plate 140, and cable carrier 120) and, finally, to nozzle 112. In this embodiment liquid source 173 is a separately located water heater capable of sourcing low pressure liquid to pour-over brewing apparatus 100. Liquid inlet 174 is in this case coupled to a line pressure water source that supplies water to liquid source 173. Hose 170 is preferably a silicone rubber hot water hose that is configured to carry liquids with temperatures above 200° F., and more preferably temperatures above 250° F., 300° F., 400° F., or even 500° F. The liquid is preferably water heated to 200° F., but could be room temperature or cold water, or could even be an alcohol used to serve other types of beverages. While nozzle control mechanism 114 is located on the opposite side of end plate 140 as nozzle 112, nozzle control mechanism 114 could be located anywhere along the liquid path from the liquid source 173 to nozzle 112, such as sitting on rail assembly 130 or carriage 110.

In another embodiment, the liquid could be fed through the system via gravity, without using a pump or line pressure. In such an embodiment, a commercially available 5 gallon water heater (not shown) could be used as the liquid source and placed at the same height as the machine, which forces water towards nozzle control mechanism 114 and nozzle 112 using gravitational forces. This water heater is comprised of an unpressurized tank which preferably automatically fills itself from a pressurized water line (plumbed into a normal plumbing system). Since the level in the tank is essentially constant and higher than nozzle 112, the head of pressure behind nozzle control mechanism 114 would be constant. Since the flow-rate is consistent, the liquid volume sent to coffee filter 152 can be precisely controlled by timing how long nozzle control mechanism 114 is opened. This system avoids the need for a custom water heater/pump assembly and allows for flexibility in type and capacity of water heater used. Alternatively, any type of liquid heating or cooling apparatus may be implemented, including a pass through or flow heating water heater, and the water dispensed may be controlled in a variety of ways, including volumetrically or by sensor. Some of these alternatives are discussed in more detail below.

Flow measurement device 172 could be installed along the fluid path anywhere between liquid source 173 and nozzle 112. Flow measurement device 172 is preferably coupled to control system 142, which monitors flow measurement device 172 to allow for the measurement of the quantity of liquid passing though nozzle 112. Using this measurement to trigger the activation of flow control device 114, control system 142 can accurately dispense precise volumes of liquid through nozzle 112.

End plate 140 functions to isolate many of the electronic components, such as rail tilt motor 136, driven tilt pulley 134, and control system 142, from the "wet" side of end plate 140 in case of spillage. The tilt motion could also be driven by a three phase brushless AC rotary servo motors directly coupled to an optical encoder, again preferably controlled by the digital servo amplifier within control system 142 that rotates rail assembly 130 around axis 138. Rail tilt motor 136 drives the rotary motion of rail assembly 130 via a belt 137 coupling the motor 136 to the driven tilt pulley 134.

Figure 3:
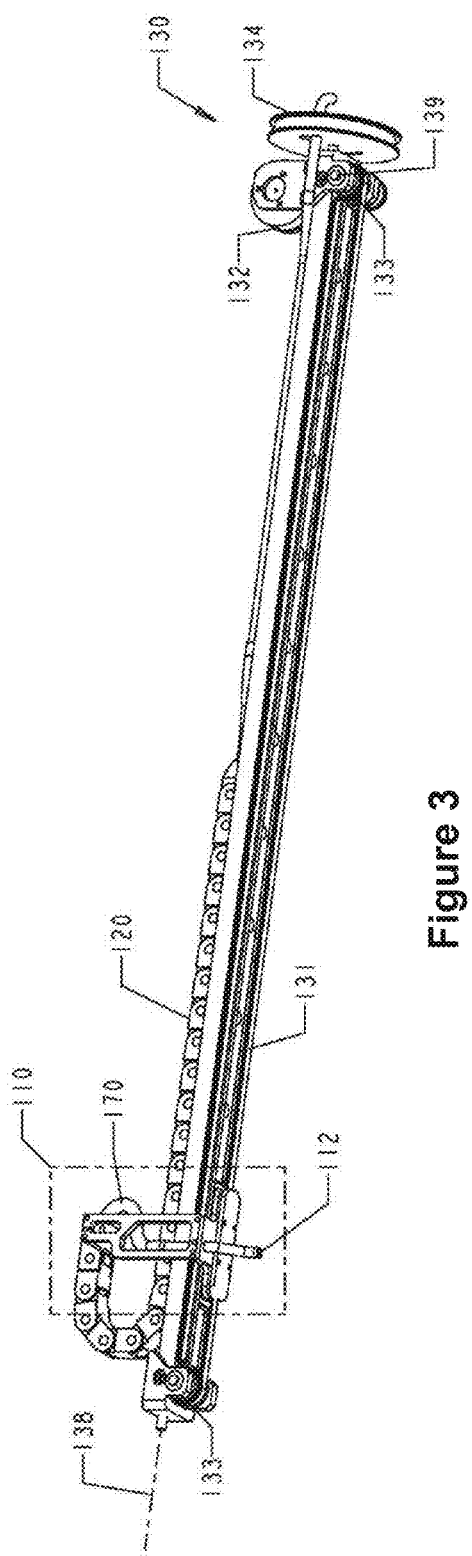
FIG. 3 is an isolated view of the rail assembly of the pour-over coffee system of FIG. 1.

FIG. 3 shows an isolated view of rail assembly 130. Carriage assembly 110 is preferably driven linearly along rail assembly 130 via tensioned carriage belt 131 coupled through an intermediate shaft 139, pulleys, and additional belt 135 to a carriage drive motor 132. Carriage drive motor 132 is preferably a three phase brushless AC rotary servo motor that pulls carriage assembly 110 back and forth along axis 138 via belt 131 running over two linear axis pulleys 133. A rotary position sensor (not shown) fixed to the motor shaft could provide position feedback to a digital servo amplifier embedded within control system 142 which monitors and controls the position of carriage assembly 110 relative to carriage drive motor 132. The position, velocity and acceleration of carriage assembly 110 could be accurately controlled at all times via a realtime motion controller embedded within the digital servo amplifier. Cable carrier 120 is preferably a flexible assembly that controls the location of the hose 170 relative to nozzle 112 to prevent the hose from catching on any features of apparatus 100 (FIGS. 1 and 2) while carriage assembly 110 is pulled along rail assembly 130. Cable carrier 120 preferably comprises a plurality of rigid containers that are rotatably coupled to one another, to provide a rigid, sturdy shield around hose 170 while simultaneously remaining flexible enough for hose 170 to bend while carriage assembly 110 moves from one end of rail assembly 130 to the other.

Carriage drive motor 132 controls a configuration of carriage belt 131, which is coupled to nozzle 112. As linear carriage motor 132 pulls and pushes on carriage belt 131, the linear position of nozzle 112 relative to the coffee filters below it is adjusted along the major surface of rail assembly 130. The range of carriage assembly 110's motion is preferably such that nozzle 112 can be aimed at any point above any of the coffee filters below, such as 156 and 157. Tilt motor 136 controls a tilt axis of tilt pulley 134. As tilt carriage motor 136 adjusts a tilt angle of tilt pulley 134, the rotational position of nozzle 112 relative to the coffee filters below it is also adjusted. Through simultaneous or alternating activation of these two motors (each controlling an axis substantially perpendicular from the other) as well as activation of the flow control device 114, the electronically controlled apparatus' control computer system 142 can dictate both the direction of and the quantity of liquid dispensed from nozzle 112.

Each motor preferably has continuous feedback that is sent to controller computer 142 as to its position. Upon startup of apparatus 100, preferably nozzle 112 is gently driven to a hard stop along each axis of movement, preventing the motor from going beyond a fixed point. This allows control system 142 to reset each motor to a repeatable 'zero' position for each axis, recalibrating the motor. In some embodiments, control system 142 might recalibrate each motor periodically, such as every 5 minutes, every 10 minutes, every 20 minutes, every 30 minutes, every hour, every 2 hours, or every 4 hours.

A range of motion constraint in the form of one or more pins (not shown) fixed to end plate 140 riding in a arc shaped slot through the axial surface of the driven tilt pulley 134 could be used to constrain the range of motion to prevent nozzle 112 from swinging too far and spurt water beyond the range of one of coffee filters 156, 157, or 159 below. One or more pins could also be fixed to rail assembly 130 to constrain the movement range of carriage assembly 110, although one or both of the end plates could also serve as a range of motion constraint. Generally, only one range of motion constraint is used for each motor, as the range of motion constraint is typically used to "reset" the motor to zero.

Figure 4A:
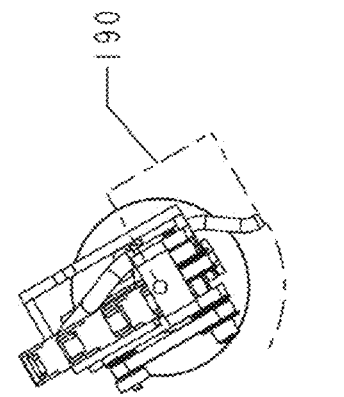
FIGS. 4a, 4b, and 4c are plan views of the carriage assembly shown in FIG. 3.
Figure 4B:
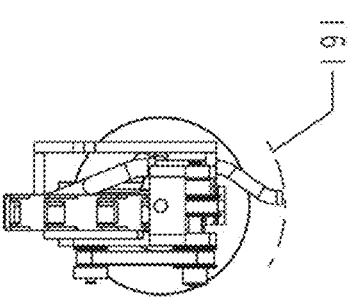
Figure 4C:
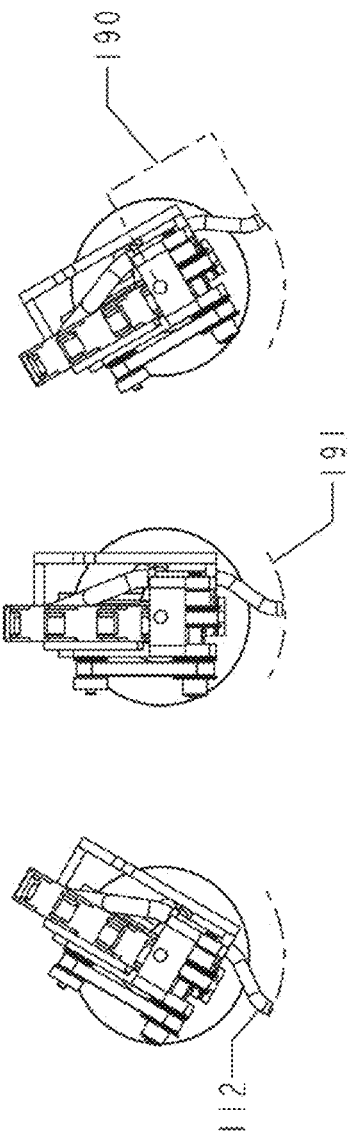

Rail assembly 130 generally supports linear carriage belt 131, carriage drive motor 132, carriage assembly 110, cable carrier 120, the linear axis pulleys 133 and the driven tilt pulley 134. With zero degrees defined as nozzle 112 pointing straight down, such an assembly preferably rotates back and forth around axis 138 over a range of at least −30 to 30 degrees, −40 to 40 degrees, −50 to 50 degrees, −70 to 70 degrees, or even −90 to 90 degrees, although greater or lesser degrees of rotation (symmetrical or asymmetrical) are within the scope of the invention. For example, as shown in FIG. 4c, the end of nozzle 112 could be offset from axis 138 by distance 190. FIG. 4a shows rail assembly 130 oriented at −30 degrees, FIG. 4b show rail assembly 130 oriented at zero degrees, and FIG. 4c shows rail assembly 130 oriented at 30 degrees. As shown in FIGS. 4a, 4b and 4c, when rail assembly 130 is rotated about axis 138, the tip of nozzle 112 traces arc 191, allowing flow from the nozzle to scan back and forth an axis perpendicular to axis 138 as rail assembly 130 is rotated by control system 142.

While many of the embodiments described herein describe using a coffee filter (not shown) mounted in a coffee filter holder (such as coffee filter holder 156), brewing apparatus 100 could be used to serve a variety of beverages.

For example, instead of mounting a coffee filter in coffee filter holder 156, a tea filter holder could be mounted in hole 153, allowing for tea to be brewed instead of coffee. Alternatively, cold beverages such as soda or alcoholic beverages fed through nozzle 112 could be served without departing from the scope of the present invention. Accordingly, the apparatus 100 may be configured to implement specific recipes for beverages at each of multiple stations, for example the apparatus may brew a recipe for tea at a first station while brewing pour-over coffee at a second station or vice versa. Apparatus 100 could also be configured to allow multiple liquids to be dispensed consecutively, to allow for a single cup incorporating multiple ingredients, such as brewing coffee incorporating alcohol or the like.

Each coffee-making station on apparatus 100 preferably has one or more buttons (not shown) and indicator light(s) (not shown) associated with it and located either above or below its coffee-making station. In a preferred embodiment, the control computer system 142 could alert the operator (such as a barista) through a notification module (not shown), such as a visual lamp, an audio sound, or a tactile vibration. For example, a lamp could be associated with each coffee station, activating when the unit is turned on and is ready for hot water dispensation, and blinking while the coffee station is busy, such as when performing a continuous or staggered dispensation of hot water. A single light could be used to signify that the station is ready, or a plurality of lights could be used to signify that the station is ready for a particular step. For example, a green light could be used when the apparatus is ready for a first dispensation of water into an empty coffee filter, a blue light could be used when the apparatus is ready for a second dispensation of water into a filled coffee filter, and a yellow light could be used when the apparatus is ready for a third staggered dispensation of water into a filled coffee filter with primed coffee grounds. In some embodiments, only two indicators are needed: a first indicator for a first dispensation of water into an empty coffee filter, and a second indicator for a second dispensation of water into a filled coffee filter. The third dispensation could automatically occur after a predetermined time period for carbon dioxide to bubble out of the coffee grounds. Each coffee cup station preferably has its own set of buttons and indicator lamps.

The control computer system 142 generally directs the motion of motors 132 and 136 as well as the activation of flow control device 114. Since timing can be crucial in the pour-over process, control computer 142 could be configured to periodically check each of the coffee station timers to ensure that constraints are met. In one embodiment, when several pours are scheduled between different coffee stations, control computer 142 is configured to execute a scheduling algorithm to find the next highest priority task to derive priorities and costs of performing actions such as transit of carriage assembly 110 to a station, a length of a pour, or time since the last spurt (for a staggered dispensation). Preferably, the highest priority actions have the smallest cost attributed to each action. A traveling salesman type algorithm is preferably used to calculate the smallest cost to perform all of the queued tasks between various coffee stations of pour-over brewing apparatus 100.

Control computer 142 could also be configured to log start and stop times of each pour motion for later post-processing and optimization verification. Such log files are preferably stored in non-transitory memory in a form that is easily analyzed, such as an Excel® file. A daily cup counter could also be incremented after each cup of coffee is made and stored in a database or stored in separate log files in a non-volatile memory. In a preferred embodiment, control computer 142 could be configured to periodically sync or upload its log file with a server computer that keeps records on individual customers. Using such a method, a machine could increment the total number of cups a customer has ordered for a "virtual coupon" that activates when a certain number of cups has been reached. In addition, by uploading data from different brewing apparatus', a centralized database or repository could be formed with aggregated data from a plurality of apparatus'. An admin user might mine such a repository to create performance reports, such as which pour-over coffee apparatus' are operating at peak efficiency, when peak coffee times occur, or which recipes are ordered the most often.

As a result of the flexibility of the two-axis (linear and rotary) servo control system, systematic or arbitrary pouring patterns could be commanded by control computer 142 and sent to motor controllers for carriage drive motor 132 and rotary motor 136 in real-time. In one embodiment, a plurality of beverage recipes are pre-programmed and used in the process, with the ability to add additional patterns through a user interface, such as a network-attached computer or mobile phone. Control computer 142 could also be configured to compute new simple spiral patterns based on a few input parameters: such as starting radius, ending radius, starting angle, angle spacing between points, and number of complete revolutions. More complex patterns could also be created by concatenating a plurality of simple patterns in serial. Using such a system, a user or an admin of the system could have the ability to customize his/her own brewing style by adjusting these parameters at the time of ordering or machine setup.

The control computer station preferably includes a Wi-Fi connection (not shown) to a local area network where communication with tablets, smart phones, and laptops is possible for orders and customizations. If an Internet connection is available, orders from remote customers could also be added to the queue, such as through a mobile phone app or a website. Customers who order via this self-service method could have their credit cards or debit accounts charged ahead of time or when the coffee is brewed to reduce congestion at a coffee shop register. Remote customers could also opt-in to receive alerts and real-time status of their order's place in the queue and/or an estimated time of completion during peak hours. By connecting to an outside network, such as the Internet, the barista could also have the ability to assign settings for individual cups determined by others or share their own settings with others via a commonly accessed remote data repository (e.g. a computer server hosting community of baristas) having a non-transient computer-readable memory.

Figure 6:
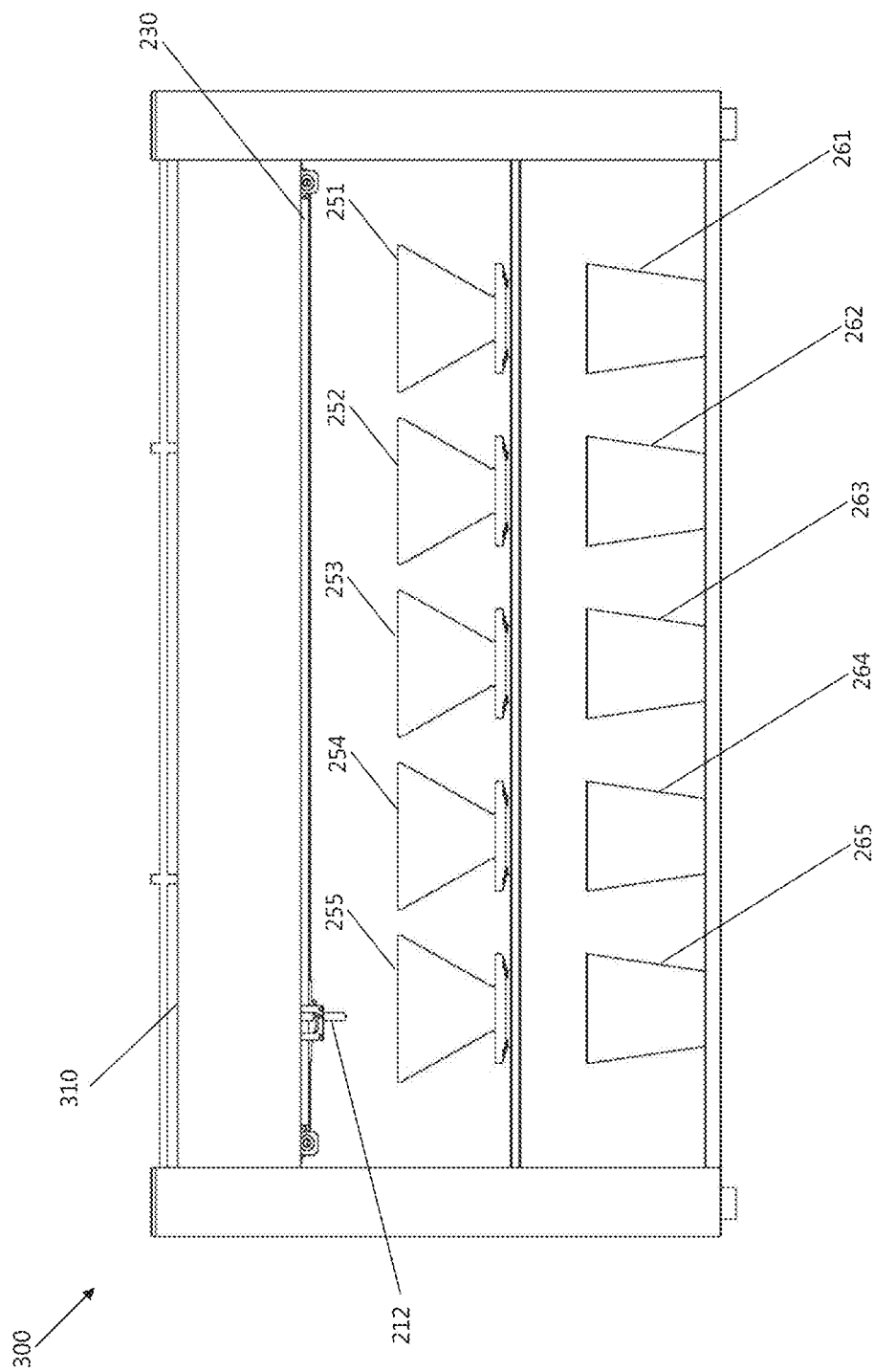
FIG. 6 is a rear plan view of the exemplary pour-over coffee system of FIG. 5.

FIGS. 5 and 6 show a front and rear view, respectively, of brewing apparatus 300, which is brewing apparatus 100 having a left cover 322, a right cover 324, and a top cover 310 coupled to the chassis of brewing apparatus 100. End covers 322 and 324 are topped by covers 323 and 325 in order to seal off the end sections of apparatus 300. Each of covers 322, 323, 324, 325, and 310 preferably have a seal located within a centimeter of the perimeter of the cover to create a substantially watertight seal, preventing a majority of liquid from entering the chambers that the covers protect. Rack 250 supports filter holders 251, 252, 253, 254, and 255 which hold filters, such as coffee filters, tea infuser filters, or other apparatus' useful for beverages. Below, drip tray 260 comprises a series of drip holes that catch excess liquid that may not be caught by one of cups 271, 272, 273, 274, and 275. Preferably drip tray 260 has circular markers (not shown) underneath the cups that show a barista where to place the cup during operation. Buttons 311, 312, 313, 314, and 315 are functionally coupled to control computer system 245 to act as a user interface through which a barista could act. Each of the buttons 311, 312, 313, 314, and 315 are preferably surrounded with an indicator light around its perimeter, each of which acts as a notification to a barista regarding the status of the coffee station located below each button. Button 311 is associated with coffee filter holder 251 and cup 271, button 312 is associated with coffee filter holder 252 and cup 272, 313 is associated with coffee filter holder 253 and cup 273, 314 is associated with coffee filter holder 254 and cup 274, and 315 is associated with coffee filter holder 255 and cup 275.

In a preferred embodiment, the control computer system 142 could alert the operator (such as a barista) through a notification module (not shown), such as a visual lamp, an audio sound, or a tactile vibration. For example, a lamp could be associated with each coffee station 261, 262, 263, 264, and 265, activating when the unit is turned on and is ready for hot water dispensation, and blinking while the coffee station is busy, such as when performing a continuous or staggered dispensation of hot water. A single light could be used to signify that the station is ready, or a plurality of lights could be used to signify that the station is ready for a particular step. For example, a green light could be used when the apparatus is ready for a first dispensation of water into an empty coffee filter, a blue light could be used when the apparatus is ready for a second dispensation of water into a filled coffee filter, and a yellow light could be used when the apparatus is ready for a third staggered dispensation of water into a filled coffee filter with primed coffee grounds. In some embodiments, only two indicators are needed: a first indicator for a first dispensation of water into an empty coffee filter, and a second indicator for a second dispensation of water into a filled coffee filter. The third dispensation could automatically occur after a predetermined time period for carbon dioxide to bubble out of the coffee grounds. Each coffee cup station preferably has its own set of buttons and indicator lamps.

In one contemplated method of using brewing apparatus 300, all indicator lights are off to indicate to a coffee barista that any of the five coffee stations are ready to use. In some embodiments, where a remote customer may schedule a recipe to a coffee station, an indicator light may blink rapidly to indicate to a coffee barista that a cup of coffee is queued to be made at that station. To begin the coffee-making process, an operator barista places a new filter in filter holder 251 and presses button 311, which is the appropriate button associated with coffee filter holder 251. Such a button could start to blink once the button has been pressed, indicating that the station is in use. Pressing the button sends a signal to control computer 142 that the first dispensation of water should be started, and the control computer then queues the first dispensation in the system. The indicator light around button 311 continues to blink, showing the operator barista that coffee-making at that station is in process.

Control computer 142 processes all queued jobs, and when it's time for the first coffee station to receive its first dispensation of water, control computer 142 activates linear carriage motor 132 and tilt carriage motor 136 to manipulate the position of nozzle 112. Control computer 142 also activates nozzle control mechanism 114 to dispense water, typically hot water when brewing coffee, to rinse the empty filter in filter holder 251. After the machine rinses the empty filter with nozzle 112 the indicator around button 311 could then turn off, notifying the operator barista that the machine is waiting for coffee grounds to be added to the filter. Once this is done, the coffee barista could then place a cup underneath the station, and press button 311, sending a signal to control computer 142 that it is time for the second dispensation of hot water should be queued. The indicator light around button 311 could then turn on without blinking, indicating that liquid dispensations into the cup will occur.

Again, control computer 142 processes queued jobs until the second dispensation job reaches the top of the queue and lightly wets coffee grounds in filter holder 251. Once the system has waited a pre-programmed amount of time for the coffee to effervesce, control computer 142 could commence the third dispensation of water, typically involving a staggered pour. Once the brewing cycle is finished the indicator turns off again, notifying the operator that the coffee is ready and another cup could start brewing.

Any of the empty stations can be utilized at any time to start a new cup. Once a station's brewing cycle is complete and its indicator light returns back to green, it is immediately ready to begin another cup. Before this happens, the operator barista should clear the finished cup of coffee and used filter from the station.

In one embodiment, the coffee-making procedure consists of five steps: filter rinse, bloom, and three consecutive pours. A filter rinse is a quick wetting of the majority of the empty filter area before the coffee grounds are added. For example, a barista could place a filter in filter holder 251 and push button 311 to initiate the filter rinse. The rinse is performed without a cup below the filter holder so that the hot water drips down and drains through the drip tray, such as drip tray 260, at the base of the machine. The purpose of the rinse is to wash out the unpleasant taste of the filter and also to warm up the filter holder. After the filter rinse, the operator could then add coffee grounds to the wet filter and add a cup, such as cup 271, below the filter. Once this is done, the operator could then press a button, such as button 311, to initiate the bloom pour (second dispensation of hot water).

The bloom is the initial wetting of the grounds. The control computer system is preferably configured to deliver just enough water to wet the grounds completely, done in a pattern (for example a inward spiral followed by an outward spiral) which wets the grounds evenly. As stated before, a cup, such as cup 271, could be placed below the filter during the bloom to catch some escaping water during the bloom, but the majority of the added water is absorbed by the coffee grounds in the filter so only a small amount of brewed coffee drips into the cup. The control computer system is preferably programmed with a fixed waiting period after the bloom, for example 30 seconds. By incorporating the waiting period into the control computer system, the control computer system prevents an operator barista from initiating the brew pour too soon due to impatience, and also allows the control computer system to utilize the nozzle at other stations for other recipes while the control computer system is waiting for the bloom to finish.

Once this waiting period is over the main pour cycle could be initiated by the operator barista placing a coffee cup underneath the filter and by pushing a button, such as button 311, to initiate the brew process. A pre-determined volume of water is added in a pattern (for example a spiral pattern) intended to evenly wet all of the grounds and fill the filter holder with water up to a threshold level, such as 2 ounces. The complete pour cycle for the brew process is typically made up of multiple staggered pours with pre-determined waiting periods in between. In a preferred embodiment, the coffee is brewed using three identical pours with a 30 second wait between each pour, but any number of pours with associated waiting periods could be implemented to suit different roasts of beans, serving sizes, or user preference.

The rinse, bloom and brew pour patterns could each be programmed separately from one another. For example, the rinse pattern could be a single spiral with no waiting period, the bloom pattern could be two spirals with a 30 second waiting period, and the main brew pour pattern could be 3 spirals with a 30 second waiting period, followed by an artistic pattern. Furthermore, the number and pattern of brew pours need not be fixed. Any sort of timing scheme could be implemented to suit any sort of coffee or serving size depending on customer need. Water volumes are adjustable. Serving sizes are not limited to a single size at any one time; i.e. any combination of serving sizes can be poured simultaneously. For example a small serving size could be poured in one coffee station, a medium serving size could be poured in another coffee station, and a large serving size could be poured in a third coffee station. Preferably, the computer system calculates the time in between pours to minimize the wait time between pours when a plurality of staggered pours occur simultaneously between stations in the same pour-over brewing apparatus.

FIGS. 7A-7Q show exemplary user interfaces that could be instantiated on remote mobile devices functionally coupled to a control computer system, such as control computer system 142, via a network interface. While FIGS. 7A-7Q show user interfaces displayed on a touch-screen mobile device, such user interfaces could be displayed on any of a variety of user interface devices, such as a desktop computer or a tablet.

FIG. 7A shows a user interface 5010 having a station summary button 5011, a personalized recipe summary button 5012, a shared recipe button 5013, a community recipe button 5014, a help button 5015, a settings button 5016, and a sign out button 5017. User interface 5010 is shown euphemistically as an exemplary admin user interface that an administrator user, such as a coffee or tea barista, might use to send commands to a pour-over brewing apparatus' control computer system. As shown, an admin user, John Smith, is logged into the system, and could log out via sign out button 5017. A user could activate button 5015 to obtain instructions on how to use the user interface, and could activate button 5016 to access settings specific to the "John Smith" user account. Each of buttons 5011, 5012, 5013, and 5014 are utilized to allow the admin user to access a specialized user interface menus.

For example, a user could activate station summary button 5011 to access a station summary user interface 5020 shown in FIG. 7B. A user could activate menu button 5021 to go back and access the main menu 5010, or activate settings button 5022 to access settings specific to the local station settings of the control computer system. User interface 5020 displays a station summary for each of the stations 1-5 that the control computer system controls. Each station is configured for a different recipe, and is at a different stage of the process.

Each station summary shows selected information about the station. For example, for station 1, a summary 5023 shows a unique identifier of the station ("No. 1"), the current status of the station ("Pouring"), whether the nozzle is engaging the station ("IN PROGRESS"), an identifier of a recipe being used at the station ("Costa Rica Recipe"), and an option to edit the attributes of the station via edit button 5025. Since station 1 is currently brewing coffee, edit button 5025 is grayed out. Contrast summary 5023 for station 1 against summary 5025 for station 2, which shows a different unique identifier of the station ("No. 2"), the current status of the station ("Filter Wet (Waiting to Pour)"), whether the nozzle is engaging the station ("UP NEXT"), an identifier of a recipe being used at the station ("Ethiopia Bean Reci . . . "), and an option to edit attributes of the station via edit button 5026. Since the nozzle is not currently engaging station 2, edit button 5026 is not grayed out and an administrator user could use edit button 5026 to edit the recipe at station 2.

While edit button 5024 is grayed out, a user could still touch station summary 5023 to access a coffee apparatus queue of station 1, which is displayed in user interface 5030 in FIG. 7C. Like user interface 5020, a user could activate menu button 5031 to access the main menu, or edit button 5032 to access a settings menu specific to the queue for station 1. As shown, coffee station 1 has the Costa Rica recipe in progress in progress window 5033, with 54% of the pouring finished. Two recipes are waiting in the queue: Tom's Recipe shown in status window 5034 and Jeremy's Recipe shown in window 5036. A user could activate button 5035 to edit attributes of Tom's Recipe or could activate button 5037 to edit attributes of Jeremy's Recipe. Altering an attribute of a recipe would then be reflected by the pour-over brewing apparatus when the recipe reaches the top of the queue.

In FIG. 7D, a user interface 5040 shows a user interface that could be activated when a user has hit the edit button 5032 to edit the queue of upcoming recipes. A user could activate cancel button 5041 to reject all changes to the queue, or could activate done button 5042 to accept all changes to the queue. Progress window 5042 continues to show that coffee station 1 has the Costa Rica recipe in progress with 54% of the pouring finished. A user could activate minus button 5043 to the left of Tom's Recipe to delete the recipe from the queue, activate the dashed lines 5045 to the right of Tom's Recipe to edit the recipe itself, activate minus button 5046 to the left of Jeremy's Recipe to delete the recipe from the queue, or activate dashed lines 5047 to the right of Jeremy's Recipe to edit the recipe itself.

Activating dashed lines 5047 could bring up user interface 5050 shown in FIG. 7E, displaying an edit screen for Jeremy's Recipe, allowing a user to view a status of Jeremy's recipe in status screen 5051, move the recipe to another station by activating button 5052, change the queued recipe to another queued recipe by activating button 5054, view attributes of the queued recipe by activating button 5054, or exit edit screen 5050 by activating cancel button 5055.

FIG. 7F shows a user interface 5060 displaying a detailed status of coffee station 1. A user could display user interface 5060 by, for example, activating window 5033 of user interface 5030. User interface 5060 shows a back button 5061 that allows a user to exit user interface 5060, a menu button 5062 that allows a user to access the main menu user interface 5010, and a graph button 5063 that allows a user to view statistics of the pour-over apparatus over time. Detailed status window 5064 shows an indicator of the status of the coffee station, which is currently in progress in its third dispensation. A timer indicates how long the current pour has been pouring, and the name of the recipe is at the bottom of the screen. Like the user interface in FIG. 7B, the edit button 5065 has been grayed out for the recipe to prevent a user from editing a recipe in the middle of a pour.

Figures 7G, 7H, 7I:
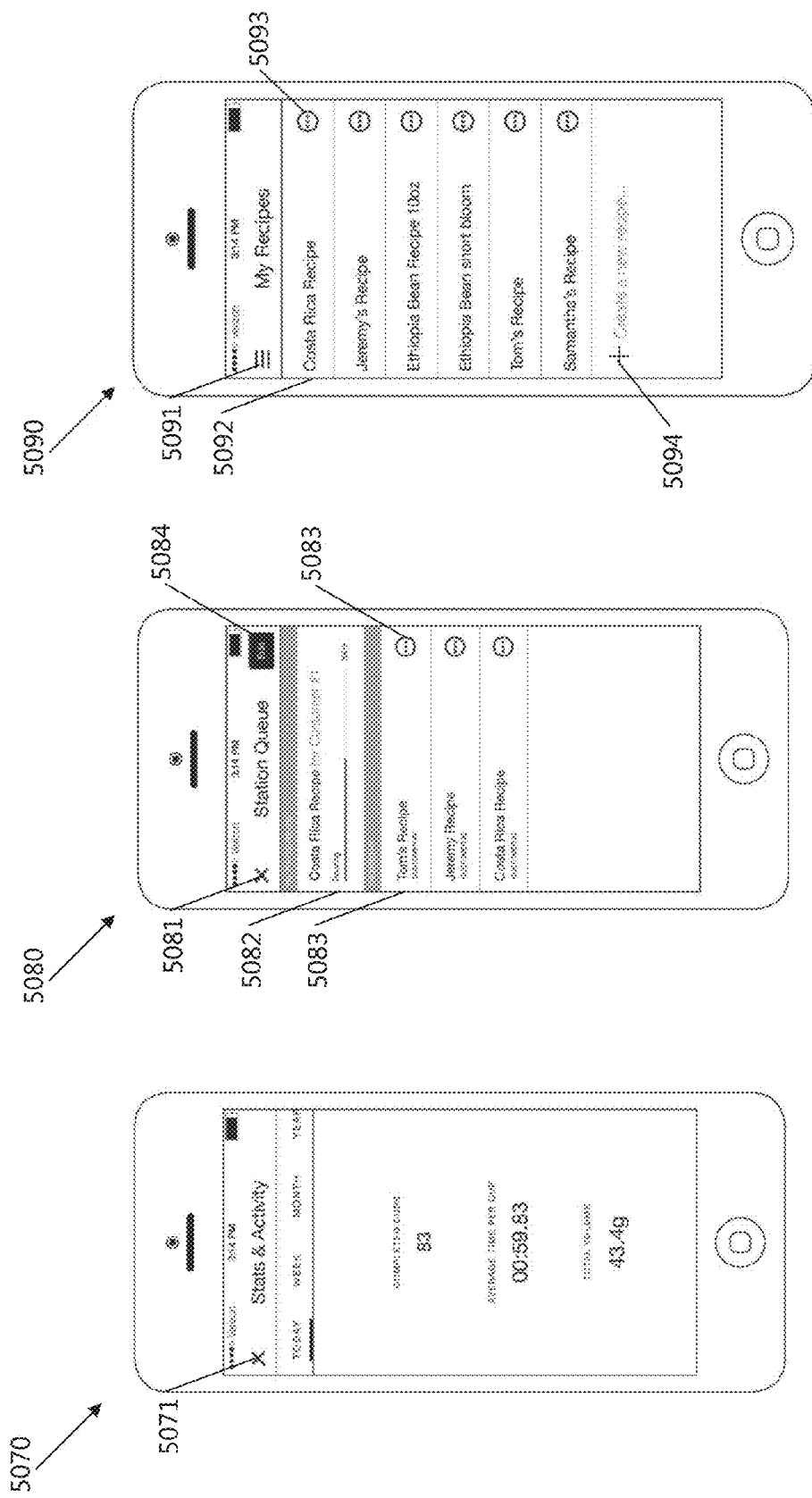
FIG. 7A-7Q show exemplary user interface embodiments that interface with an inventive pour-over coffee system.

FIG. 7G shows a user interface 5070 displaying a log of statistics collected of historical pours. A user might trigger user interface 5070 by activating graph button 5063 from user interface 5060, and could exit user interface 5070 by activating exit button 5071. The log shown in user interface

5070 could display the day's stats, the week's stats, month's stats, and so on. Typically, a user might shift between the different groups of stats by swiping left or swiping right on user interface 5070. This particular activity log collected the number of completed pours, average pour time, average waiting time for a customer, and average amount of grams poured. Other stats could be calculated and displayed on such a screen without departing from the scope of the invention. Preferably, such stats could be exported to a centralized database for analysis in order to optimize performance over time.

FIG. 7H shows a user interface 5080 showing a queue for a station. User interface 5080 might be triggered by a user activating edit button 5026 in user interface 5020. The user could exit user interface 5080 by activating exit button 5081, or edit attributes of the station queue, much like user interface 5030, by activating edit button 5084. Like user interface 5030, user interface 5080 shows summary information for a current recipe in window 5082 (displaying statistics such as how much of the pour has occurred, the name of the recipe, and the name of the intended customer), as well as pending recipes, such as recipe 5083 for Tom's Recipe, which can be edited by tapping edit button 5083.

FIG. 7I shows a user interface 5090 for a personalized recipe summary associated with a logged in user account. User interface 5090 could be triggered by a user activating personalized recipe summary button 5012 in user interface 5010. A user could exit user interface 5090 by selecting the menu button 5091. Personalized recipes are shown in a list form in user interface 5090, and each recipe can preferably be edited by activating an edit button to the right of each recipe name, such as edit button 5093. A user could also preferably add new recipes to the list of recipes by activating new recipe button 5094.

Activating an edit button, such as edit button 5093, typically triggers a recipe admin screen 5100 shown in FIG. 7J. Such a screen shows a name of the recipe in window 5101, allows a user to share a recipe with a select community of users via button 5102, allows a user to rename the recipe via button 5104, allows a user to delete the recipe from the personalized recipe summary via button 5104, or allows a user to exit admin screen 5100 via cancel button 5105.

A user who wishes to create a new recipe could activate new recipe button 5094 in user interface 5090 to trigger recipe configuration user interface 5110 shown in FIG. 7K. A user could exit recipe configuration user interface 5110 by activating back button 5111, and could save the recipe by activating save button 5112. A recipe typically consists of a series of pours, and each pour typically consists of at least three attributes: (1) the amount of water poured, (2) the pattern that the nozzle traces above the pouring area (e.g. a coffee or tea filter), and (3) the amount of time to wait after the pour before the next step is triggered. Via window 5113 a user could specify the amount of liquid that is poured during the first pour by using a slider, via window 5114 a user could select a pattern that the nozzle traces for the pour, and via window 5115 a user could specify the amount of time (typically in seconds) for the control computer system to wait before the next pour is triggered. Additional pours could be added by a user by activating button 5116. Activation of window 5114 typically triggers a new user interface window, such as user interface 5120, that a user could use to specify a pouring pattern.

FIG. 7L shows user interface 5120, which could be used by a user to specify a pouring pattern. The user could exit user interface 5120 by activating back button 5121. User interface 5120 typically displays a series of different patterns that could be used in a pour, such as pattern 5122 or pattern 5123. Alternatively, a user could define a new pattern by activating button 5124, which triggers a blank template (not shown) that could be used by a user to draw a custom-pattern. A user could also alter a size of a pattern via slider 5125, which alters the proportional size of the pattern. Such a feature is particularly useful for use with different size filters.

FIG. 7M shows a user interface 5130 that displays a list of recipes that have been shared with an account, such as the John Smith account shown in FIG. 7A. User interface 5130 could be triggered, for example, by a user that activates shared recipe button 5013 in user interface 5010. A user could trigger the main menu by activating menu button 5131, and could add a selected recipe to the user's personalized list of recipes by activating add button 5132. Much like user interface 5090, a user could view a recipe by activating a recipe's window, such as window 5133, or could select a recipe by activating a selection button, such as selection button 5134.

FIG. 7N shows a user interface 5140 that displays a list of recipes that have been shared with a community of users. A user could trigger the main menu by activating menu button 5141, and could add a selected recipe to the user's personalized list of recipes by activating add button 5142. Much like user interface 5130, a user could view a recipe by activating a recipe's window, such as window 5144, or could select a recipe by activating a selection button, such as selection button 5145. User interface 5140 also displays the recipes within group headings, such as group heading 5143. Some windows, such as window 5146, lead to additional lists of recipes.

Activating window 5146 triggers user interface 5150 shown in FIG. 7O, which displays a list of recipes for a type of roaster. A user could trigger the main menu by activating menu button 5151, or could select all of the recipes by activating the add all button 5152. Alternatively, the user could select only certain recipes by triggering a selection button, such as selection button 5154. Much like user interface 5140, a user could view a recipe by activating a recipe's window, such as window 5153.

Activating a recipe's window could trigger a user interface much like user interface 5160. A user could exit user interface 5160 by activating back button 5161 and could add the recipe by activating button 5162. Window 5163 shows the various pours that are provided by the selected recipe, allowing a user to view each of the steps in a recipe. In some embodiments, a user might even be able to edit a recipe, although user interface 5160 does not allow a user to alter aspects of the displayed recipe.

A customer user will likely have a highly simplified user interface as compared to a barista. FIG. 7Q shows an exemplary customer user interface 5170, which simply allows a customer to select a recipe to add to the customer's list of beverages to order. The customer could exit user interface 5170 by activating cancel 5171, could select a recipe by selecting a recipe's window, such as window 5173, and could trigger an order of the beverage by selecting done button 5172. Upon selection of done button 5172, the control computer system preferably adds the recipe to a queue of one of the stations, and debits a transaction account associated with the customer.

FIG. 7H shows a user interface displaying a plurality of saved recipes. Such recipes could be created by a user barista, a customer, or another entity. Clicking on a recipe name allows a user to view the recipe, while clicking on the "Edit" button and then clicking on a recipe allows a user to edit the parameters of the recipe. FIG. 7G shows a user interface displaying the edit screen, where a user could select one or more recipes to edit, and click the "Done" button when finished selecting.

FIG. 7I shows a user interface displaying an exemplary recipe for a Columbia Roast. A recipe generally consists of a plurality of pours. Each pour comprises of a number of grams of water poured, a pattern for the pour, and the number of seconds to wait before the next pour is triggered. A typical recipe comprises at least 2, 3, 4, 5, or more such pours applied sequentially one after another.

FIGS. 8A-8E show contemplated pour patterns that could be configured to be poured in a brewing apparatus control computer system. Pour patterns typically have a single start point for a nozzle to start pouring water and a single end point for a nozzle to stop pouring water. Complex pour patterns involving a plurality of start and end points could be configured by queuing a recipe, involving a plurality of consecutive pours.

FIG. 8A shows a typical spiral pattern used for brewing coffee. Larger spiral patterns that lead up to the very edges of a coffee filter could be used, such as the spiral pattern of FIG. 8B. FIGS. 8C and 8D show alternative zig-zag patterns that might be used at the close of a brew. FIG. 8E shows an alternative heart-shaped pattern that might also be used at the close of a brew. Any suitable pattern with an end point and a start point is contemplated. Some patterns might be programmed by a customer through a user interface system, allowing customers to customize not only how their coffee is brewed, but the types of wetting patterns and the length of time of certain pours. One or more centralized data repositories could have recipes that could be uploaded by baristas and/or customers, which could then be selected by customers desiring a specific recipe. With such an embodiment, such recipes preferably could be configured to be able to be associated with comments or votes to give a customer a better understanding of the qualities of the recipe before selecting it. Such recipes could conceivably be saved, shared, and accessed by baristas and/or customers through one or more centralized data repositories.

Via the user interface, a user of the machine could define a portion of, or even a complete set of, instructions for a coffee brew. Such instructions are typically called a "recipe." Such recipes are typically associated with specific coffee roasts and even specific amounts of the coffee roasts. Recipes could then be saved in a repository and assigned to a station on the machine as described elsewhere. If the user then wants to make this recipe available to others, that user could then publish electronically to a repository, such as a community repository or a specific user's repository, to become available through the user interface to other users of the computer system. Those other users could then preferably access the published recipe to assign to their own local machines ad hoc. As an example, a roaster may have an exemplary pour-over brewing apparatus in their coffee lab. There the roaster could experiment with a recipe for a specific roast and grind, and determine what the roaster thinks is the best way to prepare the brew by figuring out the correct size and number of pours, time between each, pour patterns, and wait time until the cup is done, typically specific to a type and amount of coffee grounds. The roaster could then make this recipe available electronically to their customers who also have such a machine. Similarly, a barista at a coffee shop with a machine could then improve upon the published recipe, or create an entirely different recipe for that type of coffee bean, and publish it as well for others to download and use. In one embodiment, the distribution of these recipes may be limited to selected individuals by the author of the recipe if the author wishes. In another embodiment, these electronic recipes may also be shared directly between users and then loaded onto the machine directly or through the user interface without sharing it with a wider audience.

Figure 9:
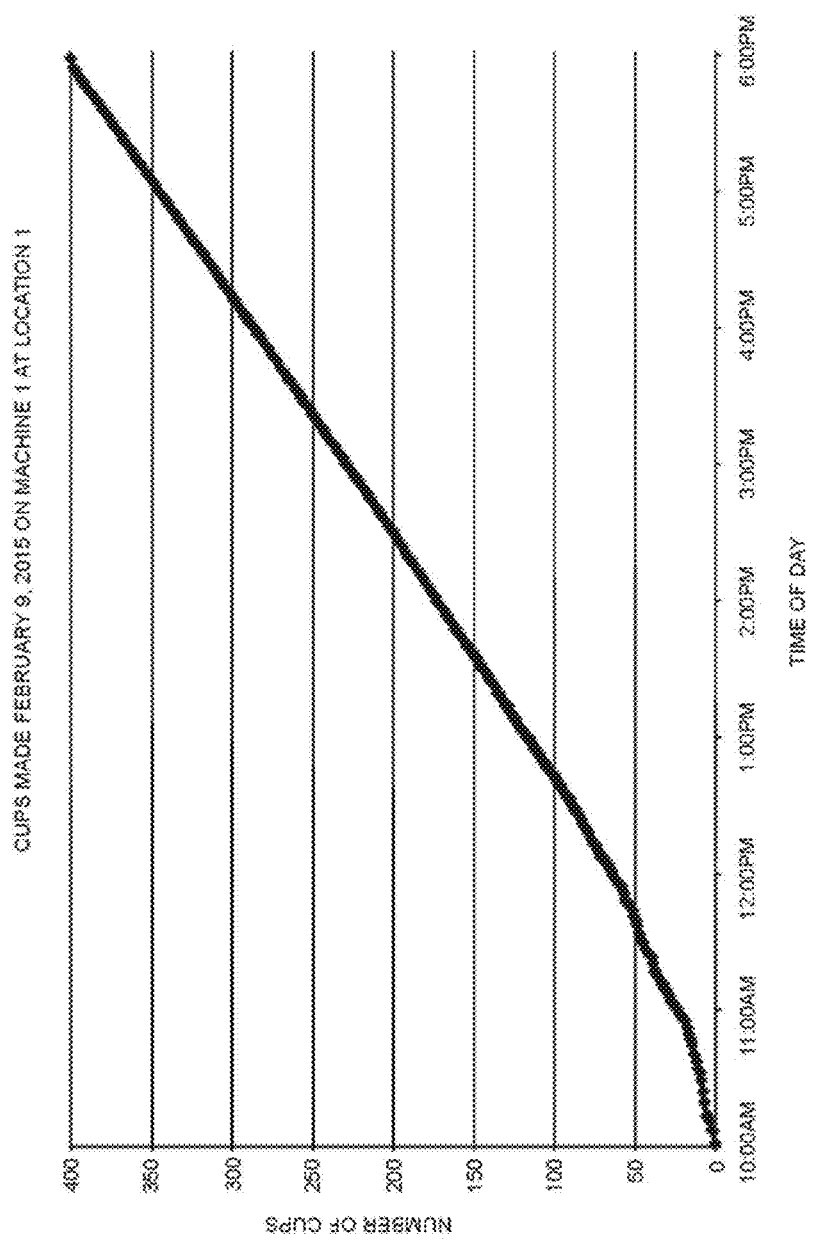
FIG. 9 shows an exemplary report graph generated by a reporting mechanism of the present invention.

Additional contemplated functionality includes the ability to collect and provide data logs and analytic reports regarding how the machines are historically used. The machine maintains a log of every cup of coffee that it makes, along with a unique time stamp and settings used. It also could be configured to keep a log of the state of the machine, any errors, interruptions, or cancellations of cups. Whenever the machine is connected to a centralized computer server through a network, such as the Internet, these logs could be sent to one or more centralized servers. This data could then be complied as reports that can then be shared with the owners of that machine as well as others. An exemplary report graph is shown in FIG. 9.

Additional modules could be utilized with embodiments of the invention without departing from the scope of the invention. For example, an automated coffee filter arm could be used to automatically place a coffee filter in a coffee filter holder, and remove the coffee filter from the coffee filter holder after use. An automated coffee grinder could also be used to automatically grind and dump coffee in an empty coffee filter after the first dispensation of water. A portioning system for the coffee grounds could be implemented to ensure a certain amount of coffee grounds is placed within the coffee filter in accordance with a recipe. A system to set, remove, and replace both coffee grounds and filters could also be implemented in the control computer system. Another arm could be used to set, remove, and replace coffee cups underneath the filter. In this manner, the entire process could be automated without the need of a human operator barista to perform these tasks. For example, a vending machine having such automated features could be implemented, allowing a vending machine user to quickly have access to a well-crafted pour-over coffee without needing a barista. Such a vending machine could have selectable recipes, or could have a user interface allowing a user to import or program in a recipe of his/her own.

One should appreciate that the disclosed techniques provide many advantageous technical effects including automating some of the more time-intensive tasks of making pour-over coffee to free a barista to perform tasks that a robot can't perform well, streamlining the coffee-making pour-over process to allow several cups of coffee to be made simultaneously, and It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An apparatus for dispensing fluid into a plurality of brewing stations comprising:
   a nozzle for dispensing fluid;
   a rail assembly comprising a rail, wherein the nozzle traverses the rail to locations adjacent each of a first brewing station and a second brewing station; and
   a tilt motor for rotating the rail assembly about an axis parallel to the rail.

2. The apparatus of claim 1, wherein the tilt motor rotates the rail assembly directing fluid from the nozzle to a plurality of areas within each of the first and second brewing stations at which the rail assembly directs the nozzle.

3. The apparatus of claim 2 wherein the tilt motor rotates the rail assembly and a carriage containing the nozzle moves the nozzle along the rail.

4. The apparatus of claim 1 wherein the rail is a linear rail and the tilt motor rotates the linear rail about a linear axis of the rail.

5. The apparatus of claim 3, wherein:
   the first brewing station is a first filter holder located under a first portion of the rail; and
   the second brewing station is a second filter holder located under a second portion of the rail.

6. The apparatus of claim 5 further comprising:
   a first cup station located under the first filter holder; and
   a second cup station located under the second filter holder.

7. The apparatus of claim 1 further comprising a controller for controlling the rail assembly, wherein the controller schedules:
   a first dispensation of fluid from the nozzle to wet the first brewing station;
   a second dispensation of fluid from the nozzle to wet a substance placed within the first brewing station; and
   a third dispensation of fluid from the nozzle to prepare a beverage in the first brewing station,
   wherein the first brewing station has a first beverage filter.

8. The apparatus of claim 7 wherein each of the first, second, and third dispensations of fluid are initiated by a signal received at the controller, wherein the signal indicates user input.

9. The apparatus of claim 8 wherein the controller comprises a network interface and wherein the signal received at the controller is received through the network interface.

10. The apparatus of claim 8 wherein the controller further schedules:
    a fourth dispensation of fluid from the nozzle prior to the second dispensation of fluid to wet the second brewing station;
    a fifth dispensation of fluid from the nozzle prior to the third dispensation of fluid to wet a substance placed within the second brewing station; and
    a sixth dispensation of fluid from the nozzle following at least a portion of the third dispensation of fluid to prepare a beverage in the second brewing station,
    wherein the second brewing station has a second beverage filter.

11. The apparatus of claim 7 wherein the controller directs the rail assembly and the tilt motor such that at least one of the first, second, and third dispensations wets the first beverage filter, or a substance placed within the first beverage filter, in a predetermined pattern.

12. The apparatus of claim 7 wherein the third dispensation of fluid comprises a plurality of pours.

13. The apparatus of claim 10 wherein each of the third and sixth dispensations of fluid comprise a plurality of pours, and wherein at least one pour of the sixth dispensation occurs between pours of the third dispensation.

14. The apparatus of claim 13 wherein timing of the pours of the third dispensation is different than timing of the pours of the sixth dispensation so that the resulting beverages are distinct.

15. The apparatus of claim 7, further comprising a notification alarm that activates when the controller is finished with at least one of the first, second, and third dispensations, respectively.

16. The apparatus of claim 1 further comprising a controller for controlling the rail assembly, wherein the controller schedules a plurality of dispensations of fluid from the nozzle while the nozzle is directed towards the first brewing station, and a plurality of dispensations of fluid from the nozzle while the nozzle is directed towards the second brewing station, and wherein at least one dispensation directed towards the second brewing station is scheduled between dispensations of fluid directed towards the first brewing station.

17. The assembly of claim 1, wherein the rail is linear and wherein each of the plurality of brewing stations are arranged in a line parallel to the rail.

* * * * *